United States Patent
Kawate et al.

(10) Patent No.: US 9,858,449 B2
(45) Date of Patent: Jan. 2, 2018

(54) MR SENSOR AND CARD READER

(71) Applicant: NIDEC SANKYO CORPORATION, Suwa-gun, Nagano (JP)

(72) Inventors: Hiroshi Kawate, Nagano (JP); Tadashi Taguchi, Nagano (JP); Katsuhisa Higashi, Nagano (JP); Yukihiko Takita, Nagano (JP); Kazutoshi Ishikawa, Nagano (JP)

(73) Assignee: NIDEC SANKYO CORPORATION, Nagano (JP)

(*) Notice: Subject to any disclaimer, the term of this patent is extended or adjusted under 35 U.S.C. 154(b) by 0 days.

(21) Appl. No.: 15/507,805

(22) PCT Filed: Aug. 20, 2015

(86) PCT No.: PCT/JP2015/073359
§ 371 (c)(1),
(2) Date: Mar. 1, 2017

(87) PCT Pub. No.: WO2016/035559
PCT Pub. Date: Mar. 10, 2016

(65) Prior Publication Data
US 2017/0293777 A1   Oct. 12, 2017

(30) Foreign Application Priority Data
Sep. 3, 2014  (JP) .................................. 2014-178696

(51) Int. Cl.
*G06K 19/077* (2006.01)
*G06K 7/08* (2006.01)
(Continued)

(52) U.S. Cl.
CPC ........... *G06K 7/084* (2013.01); *G06Q 20/341* (2013.01); *G07F 7/086* (2013.01);
(Continued)

(58) Field of Classification Search
USPC ................................................ 235/449, 492
See application file for complete search history.

(56) References Cited

U.S. PATENT DOCUMENTS

2016/0189024 A1*  6/2016  Rampetzreiter ... G06K 19/0726
                                                                235/492

FOREIGN PATENT DOCUMENTS

| JP | 2001141514 A | 5/2001 |
|----|----|----|
| JP | 2010205187 A | 9/2010 |

(Continued)

OTHER PUBLICATIONS

International Search Report corresponding to Application No. PCT/JP2015/073359; dated Oct. 27, 2015, with English translation.

*Primary Examiner* — Allyson Trail
(74) *Attorney, Agent, or Firm* — Cantor Colburn LLP

(57) ABSTRACT

An MR sensor structured to detect whether or not magnetic data are recorded in a magnetic stripe of a card having first and second tracks may include a first resistor and a second resistor serially-connected with each other and disposed at positions where the first track is passed; and a third resistor and a fourth resistor serially-connected with each other and disposed at positions where the second track is passed. The second resistor and the fourth resistor may be connected with a power supply, and the first resistor and the third resistor may be ground grounded. A potential difference between a first midpoint between the first resistor and the second resistor and a second midpoint between the third resistor and the fourth resistor may be an output of the MR sensor.

18 Claims, 11 Drawing Sheets

(51) Int. Cl.
  *G07F 7/08* (2006.01)
  *G07F 19/00* (2006.01)
  *G06Q 20/34* (2012.01)
  *G06K 19/10* (2006.01)
  *G07F 7/10* (2006.01)

(52) U.S. Cl.
  CPC ......... *G07F 19/2055* (2013.01); *G06K 19/10* (2013.01); *G07F 7/082* (2013.01); *G07F 7/1008* (2013.01)

(56) References Cited

FOREIGN PATENT DOCUMENTS

| | | |
|---|---|---|
| JP | 2011070746 A | 4/2011 |
| JP | 2014016849 A | 1/2014 |
| WO | 2012090631 A1 | 7/2012 |

\* cited by examiner

| Magnetic Flux Density | Resistance Change Rate of R2, R3 $\alpha 1$ | Resistance Change Rate of R1, R4 $\alpha 2$ | Ratio ($\alpha 1/\alpha 2 \times 100$) |
|---|---|---|---|
| 0.5mT | 0.05% | 0.50% | 10% |
| 1mT | 0.10% | 1.30% | 8% |
| 2mT | 0.40% | 2.30% | 17% |
| 3mT | 0.70% | 2.50% | 28% |

MR SENSOR AND CARD READER

CROSS REFERENCE TO RELATED APPLICATIONS

This is the U.S. national stage of application No. PCT/JP2015/073359, filed on Aug. 20, 2015. Priority under 35 U.S.C. §119(a) and 35 U.S.C. §365(b) is claimed from Japanese Application No. 2014-178696, filed Sep. 3, 2014; the disclosures of which are incorporated herein by reference.

FIELD OF THE INVENTION

At least an embodiment of the present invention relates to an MR sensor for a card reader which is used in a card reader structured to read magnetic data recorded in a card. Further, at least an embodiment of the present invention relates to a card reader comprising the MR sensor.

BACKGROUND

Conventionally, a card reader has been known which is structured to read magnetic data recorded in a card (see, for example, Patent Literature 1). The card reader described in Patent Literature 1 includes a magnetic head for reading magnetic data recorded in a card. Further, the card reader includes a pre-head (magnetic head) for detecting whether or not magnetic data are recorded in a magnetic stripe of a card which has been inserted into a card insertion port.

In an industry where a card reader is utilized, illegal acquisition of a signal outputted from the pre-head to illegally acquire magnetic information recorded in a card by a criminal, so-called "tapping" has conventionally become a large issue. In the card reader described in Patent Literature 1, a false signal output circuit structured to output a signal different from the signal corresponding to magnetic data recorded in a card is provided in an inside of the pre-head and thus, even when a criminal acquires a signal outputted from the pre-head, the criminal is unable to acquire a signal corresponding to magnetic data recorded in the card. Therefore, in this card reader, illegal acquisition of magnetic information by a criminal is prevented.

PATENT LITERATURE

[PTL 1] Japanese Patent Laid-Open No. 2010-205187

As described above, in the card reader described in Patent Literature 1, a false signal output circuit is provided in an inside of the pre-head and thus illegal acquisition of magnetic information by a criminal is capable of being prevented. However, in the card reader, a false signal output circuit is provided in the inside of the pre-head and thus the pre-head is expensive.

SUMMARY

In view of the problem described above, at least an embodiment of the present invention provides an MR sensor for a card reader which is capable of preventing illegal acquisition of magnetic information by a criminal and reducing its cost although the MR sensor is capable of detecting whether magnetic data are recorded in a magnetic stripe of a card or not when it is mounted on a card reader. Further, at least an embodiment of the present invention provides a card reader comprising the MR sensor.

To solve the above-mentioned problem, at least an embodiment of the present invention provides an MR sensor for a card reader structured to detect whether or not magnetic data are recorded in a magnetic stripe of a card, which is provided with the magnetic stripe in which magnetic data are capable of being recorded in a first track and magnetic data are capable of being recorded in a second track. The MR sensor includes a first resistor and a second resistor which are serially-connected with each other and are disposed at positions where the first track is passed, and a third resistor and a fourth resistor which are serially-connected with each other and are disposed at positions where the second track is passed. The second resistor and the fourth resistor are connected with a power supply, the first resistor and the third resistor are grounded, and a potential difference between a first midpoint between the first resistor and the second resistor serially-connected with each other and a second midpoint between the third resistor and the fourth resistor serially-connected with each other is an output of the MR sensor.

The MR sensor in accordance with at least an embodiment of the present invention is structured as described above and thus, in a case that the MR sensor is mounted on a card reader, when a card in which magnetic data are recorded in a magnetic stripe is passed through a disposed position of the MR sensor, a signal different from a signal corresponding to magnetic data recorded in the card is capable of being outputted from the MR sensor. Therefore, according to at least an embodiment of the present invention, when the MR sensor is mounted on a card reader, illegal acquisition of magnetic information by a criminal is capable of being prevented although the MR sensor is capable of detecting whether magnetic data are recorded in a magnetic stripe of a card or not. Further, in at least an embodiment of the present invention, a signal different from a signal corresponding to magnetic data recorded in a card is capable being outputted from the MR sensor by devising arrangement and the like of the first through the fourth resistors. Therefore, a structure of the MR sensor can be simplified and, as a result, a cost of the MR sensor can be reduced.

In at least an embodiment of the present invention, it is preferable that the first resistor and the second resistor are disposed in a separated state from each other in a passing direction of the card by a distance of odd number times of a half of a bit interval of the first track when "0" data are recorded in the first track, and the third resistor and the fourth resistor are disposed in a separated state from each other in the passing direction of the card by a distance of odd number times of a half of a bit interval of the second track when "0" data are recorded in the second track. According to this structure, an amplitude of a signal outputted from the MR sensor is capable of being increased. Therefore, it can be further appropriately detected whether magnetic data are recorded in a magnetic stripe of a card or not.

In at least an embodiment of the present invention, it is preferable that each of the first resistor, the second resistor, the third resistor and the fourth resistor is formed by being folded back a plurality of times in a direction perpendicular to a passing direction of the card. According to this structure, an electric current flowing through the first through the fourth resistors can be made small. Therefore, electric power consumption of the MR sensor can be restrained.

Further, to solve the above-mentioned problem, at least an embodiment of the present invention provides an MR sensor for a card reader structured to detect whether or not magnetic data are recorded in a magnetic stripe of a card, which is provided with the magnetic stripe in which magnetic data are capable of being recorded in a first track and magnetic data are capable of being recorded in a second track. The MR sensor includes a first resistor and a second resistor which are serially-connected with each other, and a third resistor and a fourth resistor which are serially-connected with each other. The first resistor and the fourth resistor are disposed at positions where the first track is passed, the second resistor and the third resistor are disposed at positions where the second track is passed, the second resistor and the fourth resistor are connected with a power supply, and the first resistor and the third resistor are grounded. Each of the first resistor, the second resistor, the third resistor and the fourth resistor is formed by being folded back two times or more in a first direction perpendicular to a passing direction of the card, and a potential difference between a first midpoint between the first resistor and the second resistor serially-connected with each other and a second midpoint between the third resistor and the fourth resistor serially-connected with each other is an output of the MR sensor.

The MR sensor in accordance with at least an embodiment of the present invention is structured as described above and thus, in a case that the MR sensor is mounted on a card reader, when a card in which magnetic data are recorded in a magnetic stripe is passed through a disposed position of the MR sensor, a signal different from a signal corresponding to magnetic data recorded in the card can be outputted from the MR sensor. Therefore, according to at least an embodiment of the present invention, when the MR sensor is mounted on a card reader, illegal acquisition of magnetic information by a criminal is capable being prevented although the MR sensor is capable of detecting whether magnetic data are recorded in a magnetic stripe of a card or not. Further, in at least an embodiment of the present invention, a signal different from a signal corresponding to magnetic data recorded in a card can be outputted from the MR sensor by devising arrangement, shapes and the like of the first through the fourth resistors. Therefore, a structure of the MR sensor can be simplified and, as a result, a cost of the MR sensor can be reduced.

In at least an embodiment of the present invention, it is preferable that, in a case that an interval of two times of a bit interval of the first track when "0" data are recorded in the first track is defined as "$\lambda_1$", an interval of two times of a bit interval of the second track when "0" data are recorded in the second track is defined as "$\lambda_2$", "$n_1$" and "$n_2$" are an integer of 0 or more, and "m" is an integer of 3 or more, each of the first resistor, the second resistor, the third resistor and the fourth resistor is formed by being folded back "m−1" times in the first direction, the first resistor comprises "m" pieces of a first resistance part which are formed in a straight line shape parallel to the first direction and are disposed at a pitch of ($n_1\lambda_1/m+\lambda_1/2$ m) in a passing direction of the card, the second resistor comprises "m" pieces of a second resistance part which are formed in a straight line shape parallel to the first direction and are disposed at a pitch of ($n_2\lambda_2/m+\lambda_2/2$ m) in the passing direction of the card, the third resistor comprises "m" pieces of a third resistance part which are formed in a straight line shape parallel to the first direction and are disposed at a pitch of ($n_2\lambda_2/m+\lambda_2/2m$) in the passing direction of the card, and the fourth resistor comprises "m" pieces of a fourth resistance part which are formed in a straight line shape parallel to the first direction and are disposed at a pitch of ($n_1\lambda_1/m+\lambda_1/2$ m) in the passing direction of the card. According to this structure, respective amplitudes of resistance change rates of the first resistor, the second resistor, the third resistor and the fourth resistor can be made small when a card in which magnetic data are recorded in a magnetic stripe is passed through a disposed position of the MR sensor.

Further, to solve the above-mentioned problem, at least an embodiment of the present invention provides an MR sensor for a card reader structured to detect whether or not magnetic data are recorded in a magnetic stripe of a card, which is provided with the magnetic stripe in which magnetic data are capable of being recorded in a first track and magnetic data are capable of being recorded in a second track. The MR sensor includes a first resistor and a second resistor which are serially-connected with each other, and a third resistor and a fourth resistor which are serially-connected with each other. The first resistor is disposed at a position where the first track is passed, the fourth resistor is disposed at a position where the second track is passed, the second resistor and the fourth resistor are connected with a power supply, and the first resistor and the third resistor are grounded. Each of the first resistor and the fourth resistor is formed by being folded back two times or more in a first direction perpendicular to a passing direction of the card, each of the second resistor and the third resistor is formed in a straight line shape parallel to the first direction. The first resistor includes three or more pieces of a first resistance part which is formed in a straight line shape parallel to the first direction, the fourth resistor includes three or more pieces of a fourth resistance part which is formed in a straight line shape parallel to the first direction. A width of the second resistor in a passing direction of the card is set to be ¹⁄₁₀ or less of a width of the first resistance part in the passing direction of the card, a width of the third resistor in the passing direction of the card is set to be ¹⁄₁₀ or less of a width of the fourth resistance part in the passing direction of the card, and a potential difference between a first midpoint between the first resistor and the second resistor serially-connected with each other and a second midpoint between the third resistor and the fourth resistor serially-connected with each other is an output of the MR sensor.

In addition, to solve the above-mentioned problem, at least an embodiment of the present invention provides an MR sensor for a card reader structured to detect whether or not magnetic data are recorded in a magnetic stripe of a card, which is provided with the magnetic stripe in which magnetic data are capable of being recorded in a first track and magnetic data are capable of being recorded in a second track. The MR sensor includes a first resistor and a second resistor which are serially-connected with each other, a third resistor and a fourth resistor which are serially-connected with each other, the first resistor is disposed at a position where the first track is passed, the fourth resistor is disposed at a position where the second track is passed, the second resistor and the fourth resistor are connected with a power supply, and the first resistor and the third resistor are grounded. Each of the first resistor and the fourth resistor is formed by being folded back two times or more in a first direction perpendicular to a passing direction of the card, each of the second resistor and the third resistor is formed by being folded back once or more in the passing direction of the card, and a potential difference between a first midpoint between the first resistor and the second resistor serially-connected with each other and a second midpoint between the third resistor and the fourth resistor serially-connected with each other is an output of the MR sensor.

In at least an embodiment of the present invention, for example, the second resistor is disposed at a position where the first track is passed, and the third resistor is disposed at a position where the second track is passed.

Further, to solve the above-mentioned problem, at least an embodiment of the present invention provides an MR sensor for a card reader structured to detect whether or not magnetic data are recorded in a magnetic stripe of a card, which is provided with the magnetic stripe in which magnetic data are capable of being recorded in a first track and magnetic data are capable of being recorded in a second track. The MR sensor includes a first resistor and a second resistor which are serially-connected with each other, a third resistor and a fourth resistor which are serially-connected with each other, the first resistor is disposed at a position where the first track is passed, and the fourth resistor is disposed at a position where the second track is passed. The second resistor and the third resistor are disposed at positions displaced from the position where the first track is passed and at positions displaced from the position where the second track is passed, and the second resistor and the fourth resistor are connected with a power supply, and the first resistor and the third resistor are grounded. Each of the first resistor and the fourth resistor is formed by being folded back two times or more in a first direction perpendicular to a passing direction of the card, and a potential difference between a first midpoint between the first resistor and the second resistor serially-connected with each other and a second midpoint between the third resistor and the fourth resistor serially-connected with each other is an output of the MR sensor.

The MR sensor in accordance with at least an embodiment of the present invention is structured as described above and thus, in a case that the MR sensor is mounted on a card reader, when a card in which magnetic data are recorded in a magnetic stripe is passed through a disposed position of the MR sensor, a signal different from a signal corresponding to magnetic data recorded in the card is capable of being outputted from the MR sensor. Therefore, according to at least an embodiment of the present invention, when the MR sensor is mounted on a card reader, illegal acquisition of magnetic information by a criminal can be prevented although the MR sensor is capable of detecting whether magnetic data are recorded in a magnetic stripe of a card or not. Further, in at least an embodiment of the present invention, a signal different from a signal corresponding to magnetic data recorded in a card can be outputted from the MR sensor by devising arrangement, shapes and the like of the first through the fourth resistors. Therefore, a structure of the MR sensor can be simplified and, as a result, a cost of the MR sensor can be reduced.

In at least an embodiment of the present invention, it is preferable that, in a case that an interval of two times of a bit interval of the first track when "0" data are recorded in the first track is defined as "$\lambda_1$", an interval of two times of a bit interval of the second track when "0" data are recorded in the second track is defined as "$\lambda_2$", "$n_1$" and "$n_2$" are an integer of 0 or more, and "m" is an integer of 3 or more, each of the first resistor and the fourth resistor is formed by being folded back "m−1" times in the first direction, the first resistor includes "m" pieces of a first resistance part which are formed in a straight line shape parallel to the first direction and are disposed at a pitch of $(n_1\lambda_1/m+\lambda_1/2\,m)$ in a passing direction of the card, and the fourth resistor includes "m" pieces of a fourth resistance part which are formed in a straight line shape parallel to the first direction and are disposed at a pitch of $(n_2\lambda_2/m+\lambda_2/2\,m)$ in the passing direction of the card. According to this structure, respective amplitudes of resistance change rates of the first resistor and the fourth resistor can be made small when a card in which magnetic data are recorded in a magnetic stripe is passed through a disposed position of the MR sensor.

The MR sensor in accordance with at least an embodiment of the present invention may be used in a card reader including a card insertion part which is formed with a card insertion port into which the card is inserted and in which the MR sensor is disposed. In the card reader, illegal acquisition of magnetic information by a criminal can be prevented although the MR sensor is capable of detecting whether magnetic data are recorded in a magnetic stripe of a card or not. Further, in the card reader, a cost of the MR sensor can be reduced and, as a result, a cost of the card reader can be reduced.

As described above, in at least an embodiment of the present invention, when the MR sensor is mounted on a card reader, illegal acquisition of magnetic information by a criminal can be prevented although the MR sensor is capable of detecting whether or not magnetic data are recorded in a magnetic stripe of a card, and a cost of the MR sensor can be reduced.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which:

FIG. 5(A) is a view showing one example of an output signal of a magnetic head and FIG. 5(B) is a view showing one example of an output signal of an MR sensor.

DETAILED DESCRIPTION

Embodiments of the present invention will be described below with reference to the accompanying drawings.

[First Embodiment]

(Schematic Structure of Card Reader)

Figure 1:
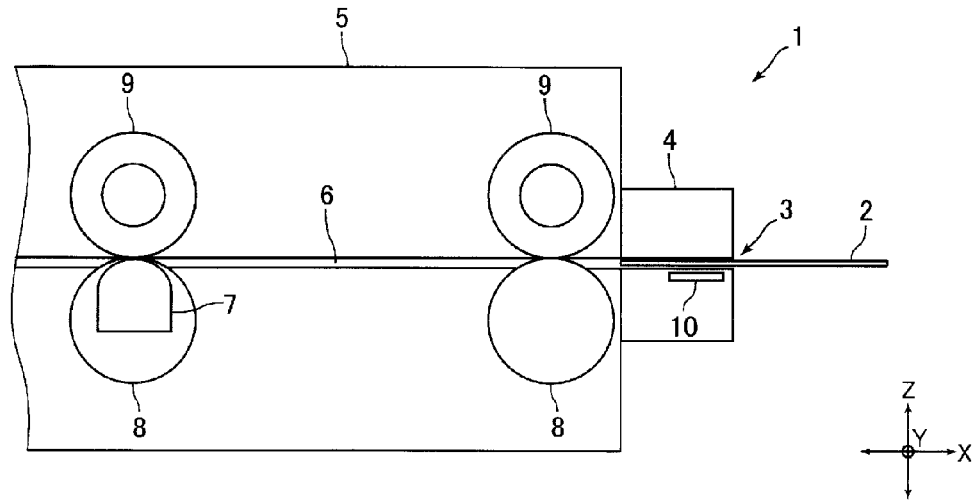
FIG. 1 is a schematic view showing a card reader in accordance with an embodiment of the present invention.
Figure 2:
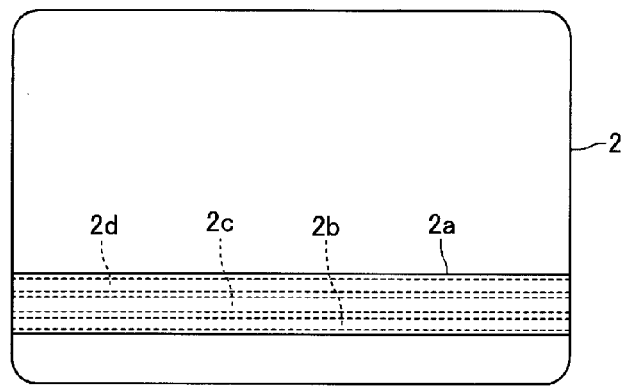
FIG. 2 is a view showing a rear face of a card in FIG. 1.

FIG. 1 is a schematic view showing a card reader 1 in accordance with an embodiment of the present invention. FIG. 2 is a view showing a rear face of a card 2 shown in FIG. 1.

A card reader 1 in this embodiment is a device which is structured to perform reading of magnetic data recorded on a card 2 and/or recording of magnetic data on a card 2, and is, for example, mounted and used in a predetermined host apparatus such as an ATM. The card reader 1 includes a card insertion part 4 formed with an insertion port 3 into which a card 2 is inserted, and a main body part 5. A card passage 6 where a card 2 inserted into the insertion port 3 is passed is formed in an inside of the card reader 1.

In this embodiment, a card 2 is passed in the "X" direction shown in FIG. 1. In other words, the "X" direction is a passing direction of a card 2. Further, the "Z" direction in FIG. 1 perpendicular to the "X" direction is a thickness direction of a card 2 which is taken into the card reader 1, and the "Y" direction in FIG. 1 perpendicular to the "X" direction and the "Z" direction is a width direction of a card 2 taken into the card reader 1.

A card 2 is, for example, a rectangular card made of vinyl chloride whose thickness is about 0.7-0.8 mm. A magnetic stripe 2a in which magnetic data are recorded is formed on a rear face of the card 2. The magnetic stripe 2a is formed along a longitudinal direction of a card 2 which is formed in a substantially rectangular shape. A card 2 is inserted into the card reader 1 in a state that its rear face faces a lower side and, in a state that a longitudinal direction of a card 2 is substantially coincided with the "X" direction (passing direction of a card 2), and is conveyed in an inside of the card reader 1. In accordance with an embodiment, an IC chip and/or an antenna for communication may be incorporated in the card 2. Further, the card 2 may be a PET (polyethylene terephthalate) card whose thickness is about 0.18-0.36 mm or may be a paper card having a predetermined thickness.

Three tracks of magnetic data comprised of a track 2b, a track 2c and a track 2d are recordable in the magnetic stripe 2a. The track 2b, the track 2c and the track 2d are arranged in this order in a short-side direction of a card 2. In this embodiment, magnetic data of the track 2c and/or magnetic data of the track 2d are recorded in the magnetic stripe 2a. Recording density of magnetic data of the track 2c is 75 bpi (bit per inch) and recording density of magnetic data of the track 2d is 210 bpi. The track 2c in this embodiment is a first track and the track 2d is a second track. In this embodiment, in a case that magnetic data of the track 2b are recorded in the magnetic stripe 2a, recording density of magnetic data of the track 2b is 210 bpi.

The card reader 1 includes a magnetic head 7 structured to perform reading of magnetic data recorded in a magnetic stripe 2a of a card 2 and/or recording magnetic data to the magnetic stripe 2a, drive rollers 8 and pad rollers 9 structured to convey the card 2 along a card passage 6, and an MR sensor 10 structured to detect whether magnetic data are recorded in the magnetic stripe 2a of the card 2 or not. The magnetic head 7, the drive rollers 8 and the pad rollers 9 are arranged in the main body part 5. The magnetic head 7 includes three channels so as to be capable of individually reading magnetic data of the three tracks 2b through 2d. The MR sensor 10 is disposed in the card insertion part 4. Next, a specific structure of the MR sensor 10 will be described below.

(Structure of MR Sensor)

Figure 3:
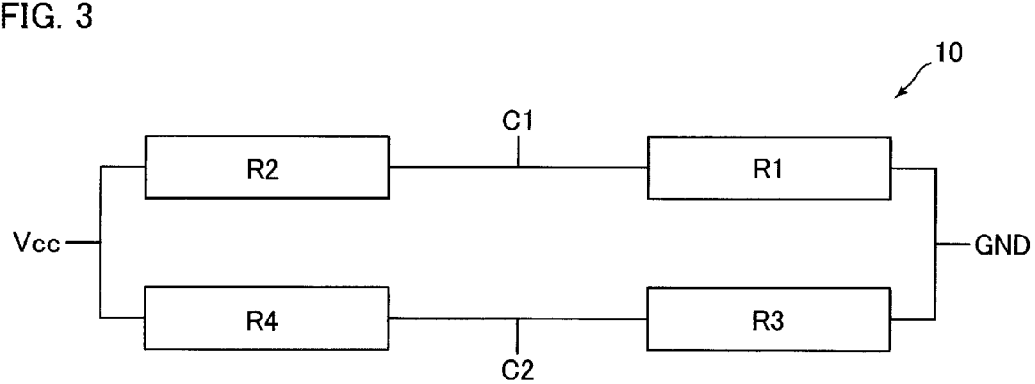
FIG. 3 is a circuit diagram showing an MR sensor in FIG. 1.
Figure 4:
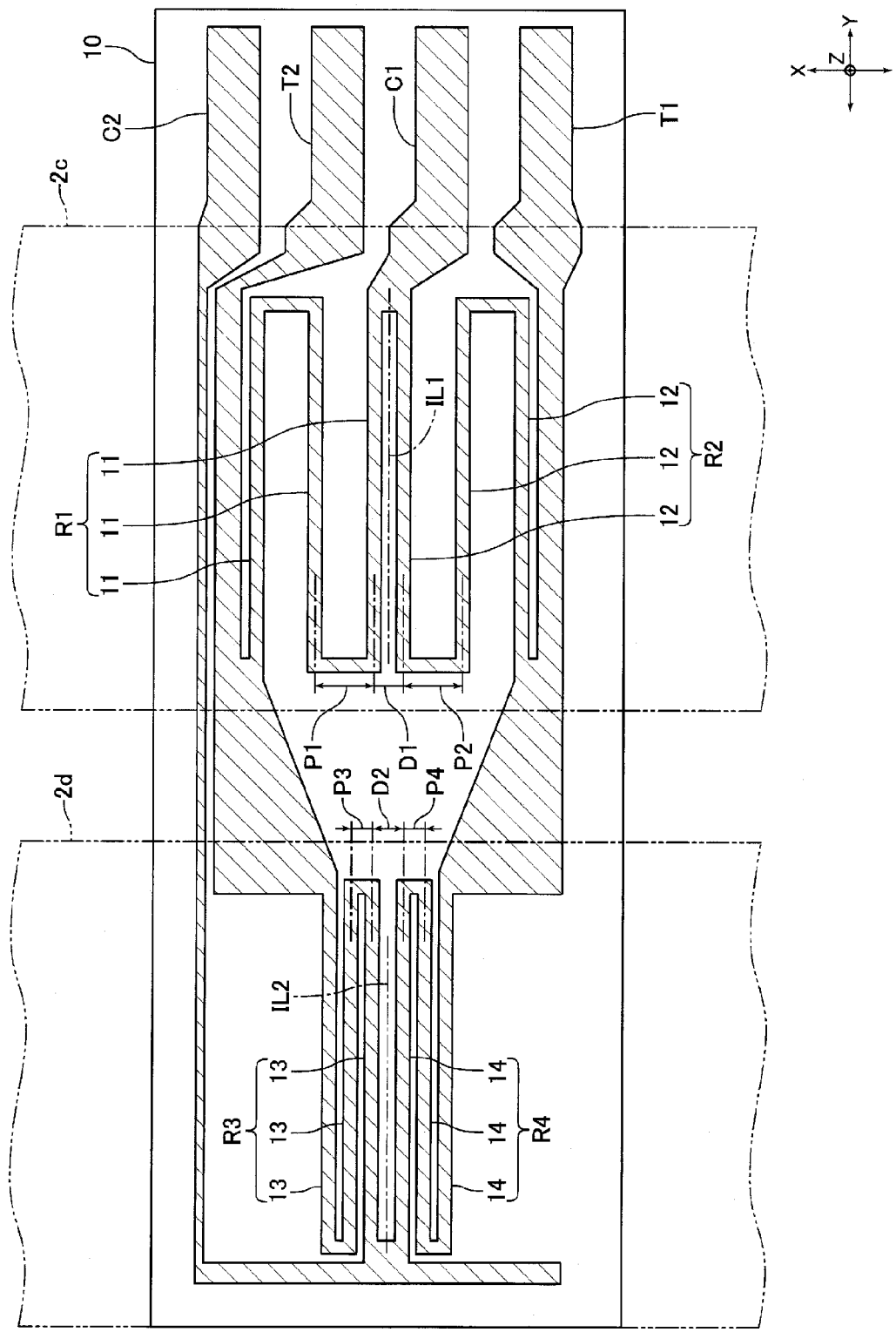
FIG. 4 is a plan view showing an MR sensor in accordance with a first embodiment of the present invention.
Figure 5A:
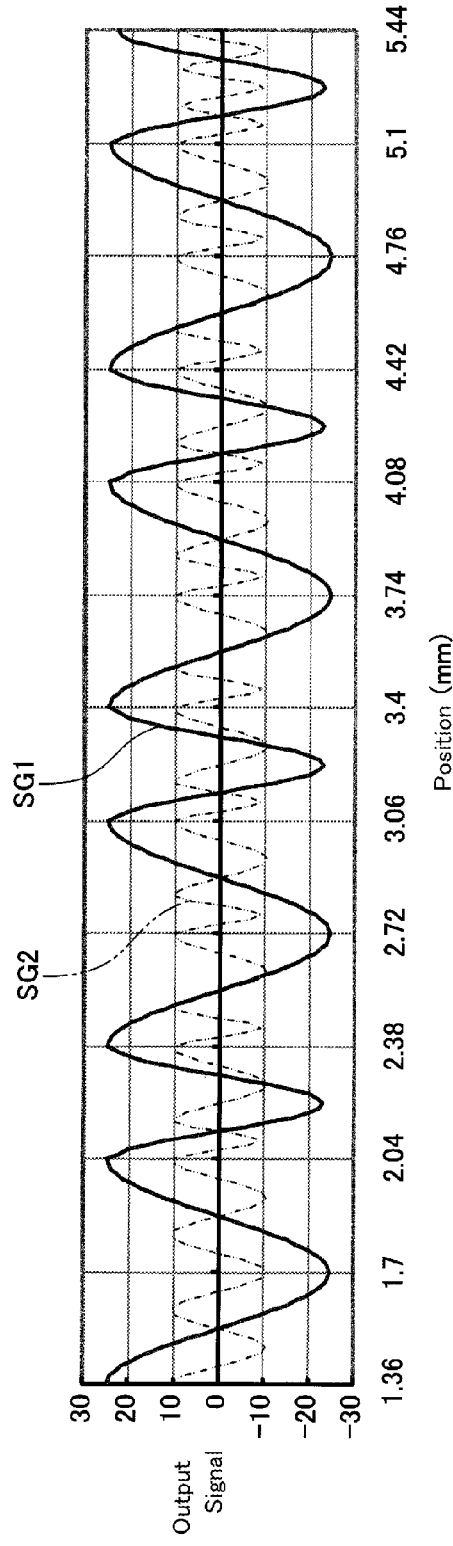
FIGS. 5(A) and 5(B) are views for explaining a difference between an output signal of a magnetic head shown in FIG. 1 and an output signal of an MR sensor shown in FIG. 4.
Figure 5B:
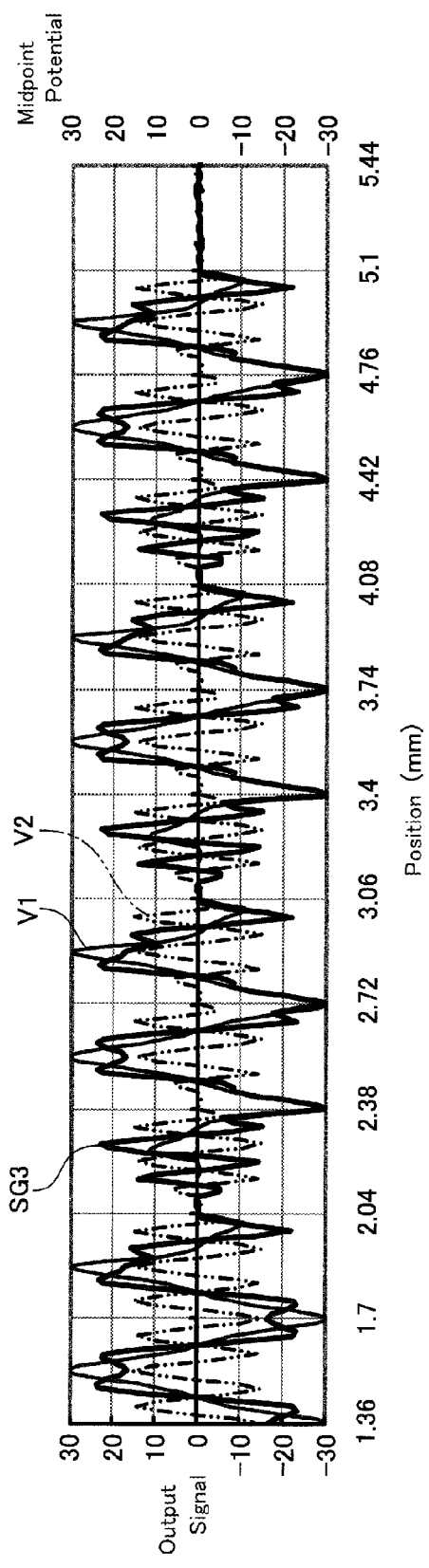

FIG. 3 is a circuit diagram showing an MR sensor 10 in FIG. 1. FIG. 4 is a plan view showing an MR sensor 10 in accordance with a first embodiment of the present invention. FIGS. 5(A) and 5(B) are views for explaining a difference between an output signal of a magnetic head 7 shown in FIG. 1 and an output signal of an MR sensor 10 shown in FIG. 4. FIG. 5(A) is a view showing one example of an output signal of a magnetic head 7 and FIG. 5(B) is a view showing one example of an output signal of an MR sensor 10.

The MR sensor 10 is, as shown in FIG. 3, provided with a first resistor "R1" (hereinafter, referred to as a resistor "R1") and a second resistor "R2" (hereinafter, referred to as a resistor "R2") which are serially-connected with each other, and a third resistor "R3" (hereinafter, referred to as a resistor "R3") and a fourth resistor "R4" (hereinafter, referred to as a resistor "R4") which are serially-connected with each other. The resistors "R1" through "R4" are, for example, formed of a thin film of ferronickel alloy. The resistor "R1" and the resistor "R2" are connected in parallel with the resistor "R3" and the resistor "R4". In accordance with an embodiment of the present invention, the resistors "R1" through "R4" may be formed of material other than ferronickel alloy.

The resistor "R2" and the resistor "R4" are connected with a power supply "Vcc". Specifically, one end of the resistor "R2" which is not connected with the resistor "R1" and one end of the resistor "R4" which is not connected with the resistor "R3" are connected with a connection terminal "T1" for the power supply "Vcc" and the connection terminal "T1" is connected with the power supply "Vcc". The resistor "R1" and the resistor "R3" are grounded. Specifically, one end of the resistor "R1" which is not connected with the resistor "R2" and one end of the resistor "R3" which is not connected with the resistor "R4" are connected with a ground terminal "T2" and the ground terminal "T2" is grounded.

The resistors "R1" through "R4" are formed by being folded back a plurality of times in the "Y" direction (short-side direction of a card 2). In this embodiment, the resistors "R1" through "R4" are formed by being folded back two times in the "Y" direction. The resistor "R1" is provided with three pieces of a first resistance part 11 which is formed in a straight line shape parallel to the "Y" direction. The resistor "R2" is provided with three pieces of a second resistance part 12 which is formed in a straight line shape parallel to the "Y" direction. The resistor "R3" is provided with three pieces of a third resistance part 13 which is formed in a straight line shape parallel to the "Y" direction. The resistor "R4" is provided with three pieces of a fourth resistance part 14 which is formed in a straight line shape parallel to the "Y" direction.

As shown in FIG. 4, the resistor "R1" and the resistor "R2" are disposed at the same position in the "Y" direction. Specifically, the resistor "R1" and the resistor "R2" are disposed at a position where the track 2c is passed in the "Y" direction. Further, the resistor "R1" and the resistor "R2" are disposed in a separated state from each other by a distance "D1" in the "X" direction. The distance "D1" is set to be a distance of odd number times of a half of a bit interval in the track 2c when "0" data are recorded in the track 2c. In this embodiment, the distance "D1" is set to be a half of a distance of a bit interval in the track 2c when "0" data are recorded in the track 2c. Specifically, since recording density of magnetic data recorded in the track 2c is 75 bpi, the distance "D1" is 0.17 mm (=25.4/(75×2)).

A pitch "P1" in the "X" direction of three pieces of the first resistance part 11 is set to be an integral multiple of a bit interval in the track 2c when "0" data are recorded in the track 2c. In this embodiment, the pitch "P1" is set to be the bit interval in the track 2c when "0" data are recorded in the track 2c and the pitch "P1" is 0.34 mm. A pitch "P2" in the "X" direction of three pieces of the second resistance part 12 is set to be equal to the pitch "P1". Further, the resistor "R1" and the resistor "R2" are formed line-symmetrically with respect to an imaginary line "IL1" parallel to the "Y" direction which passes a center position in the "X" direction between the resistor "R1" and the resistor "R2" when viewed in the "Z" direction.

The resistor "R3" and the resistor "R4" are disposed at the same position in the "Y" direction. Specifically, the resistor "R3" and the resistor "R4" are disposed at a position in the "Y" direction where the track 2d is passed. Further, the resistor "R3" and the resistor "R4" are disposed in a separated state from each other by a distance "D2" in the "X" direction. The distance "D2" is set to be a distance of odd number times of a half of a bit interval in the track 2d when "0" data are recorded in the track 2d. In this embodiment, the distance "D2" is set to be a distance of three times of a half of a bit interval in the track 2d when "0" data are recorded in the track 2d. Specifically, since recording density of magnetic data recorded in the track 2d is 210 bpi, the distance "D2" is 0.18 mm (=25.4×3/(210×2)).

A pitch "P3" in the "X" direction of three pieces of the third resistance part 13 is set to be an integral multiple of a bit interval in the track 2d when "0" data are recorded in the track 2d. In this embodiment, the pitch "P3" is set to be the bit interval in the track 2d when "0" data are recorded in the track 2d and the pitch "P3" is 0.12 mm. A pitch "P4" in the "X" direction of three pieces of the fourth resistance part 12 is set to be equal to the pitch "P3". Further, the resistor "R3" and the resistor "R4" are formed line-symmetrically with respect to an imaginary line "IL2" parallel to the "Y" direction which passes a center position in the "X" direction between the resistor "R3" and the resistor "R4" when viewed in the "Z" direction. In this embodiment, when viewed in the "Z" direction, the imaginary line "IL1" and the imaginary line "IL2" are disposed on the same straight line.

A length in the "Y" direction of the first resistance part 11, a length in the "Y" direction of the second resistance part 12, a length in the "Y" direction of the third resistance part 13, and a length in the "Y" direction of the fourth resistance part 14 are set to be equal to each other. Further, the length is set to be narrower than a width of the track 2c and a width of the track 2d in the "Y" direction. For example, the length is 2 mm. Further, a width in the "X" direction of the first resistance part 11, a width in the "X" direction of the second resistance part 12, a width in the "X" direction of the third resistance part 13, and a width in the "X" direction of the fourth resistance part 14 are set to be equal to each other. For example, the width is 80 μm. In addition, a film thickness of the resistor "R1", a film thickness of the resistor "R2", a film thickness of the resistor "R3", and a film thickness of the resistor "R4" are set to be equal to each other. For example, the film thickness is 45 nm.

In this embodiment, a potential difference (in other words, voltage) between a first midpoint "C1" between the resistor "R1" and the resistor "R2" serially-connected with each other (the connecting point of the resistor "R1" with the resistor "R2") and a second midpoint "C2" between the resistor "R3" and the resistor "R4" serially-connected with each other (the connecting point of the resistor "R3" with the resistor "R4") is an output of the MR sensor 10. Therefore, when a card 2 in which magnetic data are recorded in a magnetic stripe 2a (more specifically, a card 2 in which magnetic data in a track 2c and/or magnetic data in a track 2d are recorded) is passed through a disposed position of the MR sensor 10, a signal is outputted from the MR sensor 10.

In this embodiment, in a case that, when magnetic data recorded in a magnetic stripe 2a are read by a magnetic head 7, magnetic data are recorded in a track 2c so that an output signal "SG1" from the magnetic head 7 is varied like the solid line in FIG. 5(A) and magnetic data are recorded in a track 2d so that an output signal "SG2" from the magnetic head 7 is varied like the two-dot chain line in FIG. 5(A), when a card 2 is passed through the disposed position of the MR sensor 10, a potential (midpoint potential) "V1" of the first midpoint "C1" is varied like the solid line in FIG. 5(B) and a potential (midpoint potential) "V2" of the second midpoint "C2" is varied like the two-dot chain line in FIG. 5(B), and an output signal "SG3" of the MR sensor 10 is varied like the thick solid line in FIG. 5(B).

In other words, in this embodiment, the output signal "SG3" of the MR sensor 10 is different from a signal corresponding to magnetic data recorded in the magnetic stripe 2a (in other words, different from the output signals "SG1" and "SG2" of the magnetic head 7). In this embodiment, a magnetic field generated by magnetic data in the track 2c is stronger than a magnetic field generated by magnetic data in the track 2d. Therefore, as shown in FIG. 5(A), an amplitude of the output signal "SG2" is smaller than an amplitude of the output signal "SG1". Further, as shown in FIG. 5(B), an amplitude of the midpoint potential "V2" is smaller than an amplitude of the midpoint potential "V1".

(Principal Effects in this Embodiment)

As described above, in this embodiment, when a card 2 in which magnetic data are recorded in a magnetic stripe 2a is passed through a disposed position of the MR sensor 10, a signal is outputted from the MR sensor 10. Further, in this embodiment, the output signal "SG3" of the MR sensor 10 is different from a signal corresponding to magnetic data recorded in the magnetic stripe 2a (different from the output signals "SG1" and "SG2" of the magnetic head 7). Therefore, according to this embodiment, even when the MR sensor 10 is capable of detecting whether magnetic data are recorded in the magnetic stripe 2a or not, illegal acquisition of magnetic information by a criminal can be prevented. Further, in this embodiment, the output signal "SG3" of the MR sensor 10 can be made different from a signal corresponding to the magnetic data recorded in a magnetic stripe 2a by devising shapes and/or arrangement of the resistors "R1" through "R4". Therefore, a structure of the MR sensor 10 can be simplified and, as a result, a cost of the MR sensor 10 can be reduced.

In this embodiment, the resistor "R1" and the resistor "R2" are disposed in a separated state from each other by a distance "D1" in the "X" direction. The distance "D1" is set to be a distance of odd number times of a half of a bit interval in the track 2c when "0" data are recorded in the track 2c. Further, the resistor "R3" and the resistor "R4" are disposed in a separated state from each other by a distance "D2" in the "X" direction. The distance "D2" is set to be a distance of odd number times of a half of a bit interval in the track 2d when "0" data are recorded in the track 2d. Therefore, according to this embodiment, an amplitude of the output signal "SG3" outputted from the MR sensor 10 can be increased. Accordingly, in this embodiment, it can be further appropriately detected whether magnetic data are recorded in a magnetic stripe 2a of a card 2 or not.

In this embodiment, the resistors "R1" through "R4" are formed so as to be folded back a plurality of times in the "Y" direction. Therefore, according to this embodiment, an electric current flowing through the resistors "R1" through "R4" can be reduced. Accordingly, in this embodiment, electric power consumption of the MR sensor 10 can be restrained.

(Modified Embodiment of First Embodiment)

Figure 6:
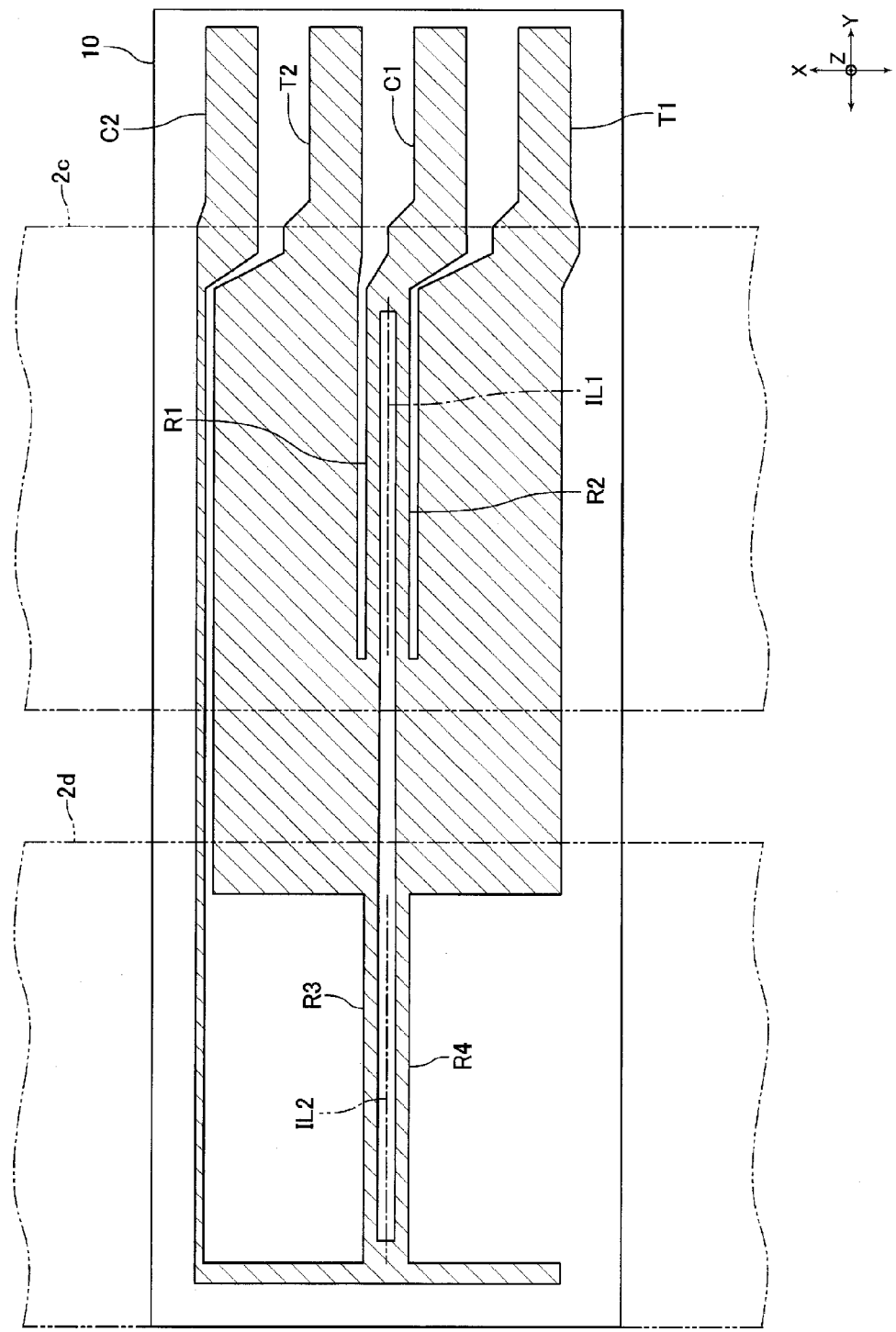
FIG. 6 is a plan view showing an MR sensor in accordance with a modified embodiment of the first embodiment.

In the embodiment described above, the resistors "R1" through "R4" are formed by being folded back a plurality of times in the "Y" direction. However, the resistors "R1" through "R4" may be formed in a straight line shape parallel to the "Y" direction as shown in FIG. 6. In this case, for example, similarly to the embodiment described above, the resistor "R1" and the resistor "R2" are disposed in a separated state from each other by a distance "D1" in the "X" direction, and the resistor "R3" and the resistor "R4" are disposed in a separated state from each other by a distance "D2" in the "X" direction. Further, in the "X" direction, the resistor "R1" and the resistor "R2" are disposed at substantially the same position as each other and the resistor "R3" and the resistor "R4" are disposed at substantially the same position as each other. In FIG. 6, the same reference signs are used in the same structures as the embodiment described above.

In the embodiment described above, the distance "D1" between the resistor "R1" and the resistor "R2" is set to be a distance of odd number times of a half of a bit interval in a track 2c when "0" data are recorded in the track 2c. However, the distance "D1" may be a distance other than a distance of odd number times of a half of a bit interval in a track 2c when "0" data are recorded in the track 2c. Similarly, in the embodiment described above, the distance "D2" between the resistor "R3" and the resistor "R4" is set to be a distance of odd number times of a half of a bit interval in a track 2d when "0" data are recorded in the track 2d. However, the distance "D2" may be a distance other than a distance of odd number times of a half of a bit interval in a track 2d when "0" data are recorded in the track 2d.

In the embodiment described above, the pitch "P1" of the first resistance parts 11 and the pitch "P2" of the second resistance parts 12 are set to be an integral multiple of a bit interval in the track 2c when "0" data are recorded in the track 2c. However, the pitches "P1" and "P2" may be values other than an integral multiple of a bit interval in the track 2c when "0" data are recorded in the track 2c. Similarly, in the embodiment described above, the pitch "P3" of the third resistance parts 13 and the pitch "P4" of the fourth resistance parts 14 are set to be an integral multiple of a bit interval in the track 2d when "0" data are recorded in the track 2d. However, the pitches "P3" and "P4" may be values other than an integral multiple of a bit interval in the track 2d when "0" data are recorded in the track 2d.

[Second Embodiment]
(Structure of MR Sensor)

Figure 7:
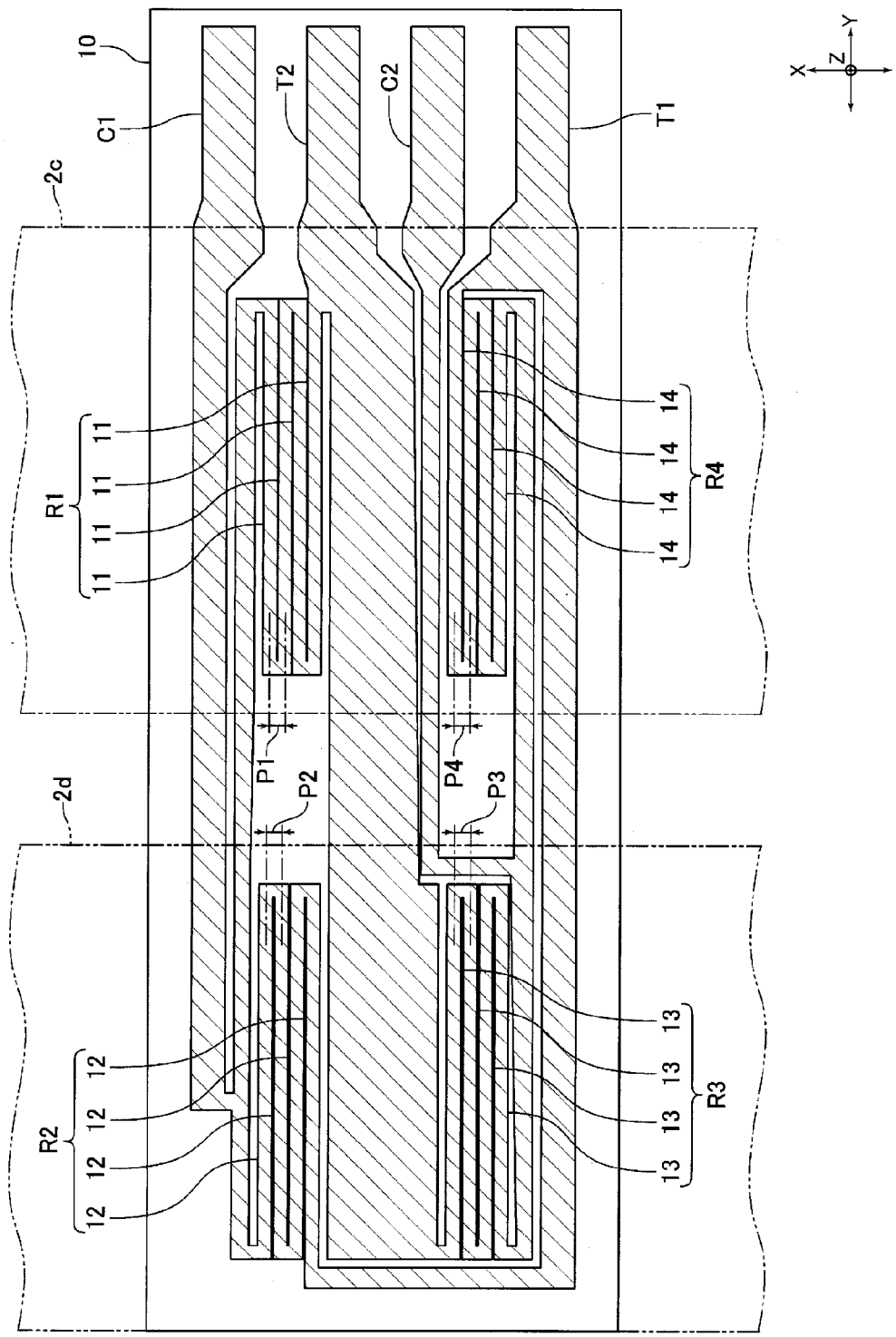
FIG. 7 is a plan view showing an MR sensor in accordance with a second embodiment of the present invention.
Figure 8:
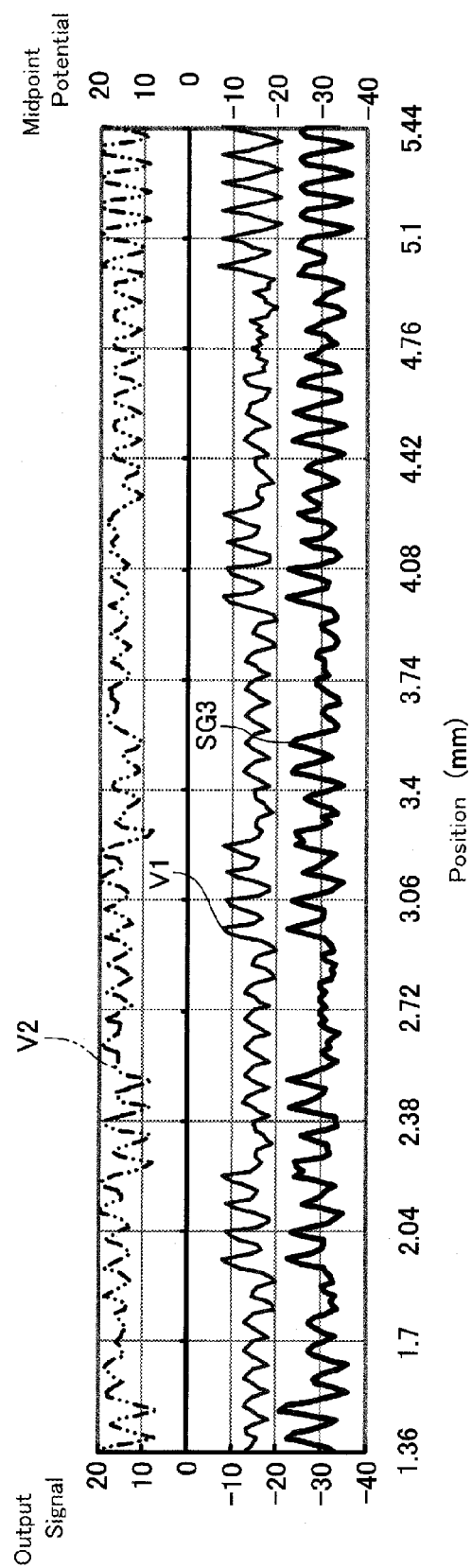
FIG. 8 is a view showing an example of an output signal of an MR sensor shown in FIG. 7.

FIG. 7 is a plan view showing an MR sensor 10 in accordance with a second embodiment of the present invention. FIG. 8 is a view showing an example of an output signal of an MR sensor 10 shown in FIG. 7.

A structure of an MR sensor 10 in a second embodiment is different from the MR sensor 10 in the first embodiment. Therefore, in the following descriptions, a structure of an MR sensor 10 in accordance with a second embodiment will be described below mainly on differences between the structure of the MR sensor 10 in the first embodiment and a structure of an MR sensor 10 in the second embodiment. In FIG. 7, the same reference signs are used in the same structures as the first embodiment.

Similarly to the MR sensor 10 in the first embodiment, an MR sensor 10 in this embodiment includes a resistor "R1" and a resistor "R2" serially-connected with each other and a resistor "R3" and a resistor "R4" serially-connected with each other. The resistor "R1" and the resistor "R2" are connected in parallel with the resistor "R3" and the resistor "R4". The resistor "R2" and the resistor "R4" are connected with a power supply "Vcc" and the resistor "R1" and the resistor "R3" are grounded. In other words, a circuit diagram of the MR sensor 10 in this embodiment is the same as the circuit diagram shown in FIG. 3.

When "m" is an integer of 3 or more, the resistors "R1" through "R4" are formed by being folded back "m−1" times in the "Y" direction. In other words, the resistors "R1" through "R4" are formed by being folded back two times or more in the "Y" direction. In this embodiment, "m"=4, and the resistors "R1" through "R4" are formed by being folded back three times in the "Y" direction. The resistor "R1" is provided with four pieces ("m" pieces) of a first resistance part 11 which is formed in a straight line shape parallel to the "Y" direction. The resistor "R2" is provided with four pieces ("m" pieces) of a second resistance part 12 which is formed in a straight line shape parallel to the "Y" direction. The resistor "R3" is provided with four pieces ("m" pieces) of a third resistance part 13 which is formed in a straight line shape parallel to the "Y" direction. The resistor "R4" is provided with four pieces ("m" pieces) of a fourth resistance part 14 which is formed in a straight line shape parallel to the "Y" direction. The "Y" direction in this embodiment is a first direction.

As shown in FIG. 7, the resistor "R1" and the resistor "R4" are disposed at the same position in the "Y" direction. Specifically, the resistor "R1" and the resistor "R4" are disposed at a position where the track 2c is passed in the "Y" direction. Further, the resistor "R1" and the resistor "R4" are disposed in a separated state from each other by a predetermined distance (for example, 1.06 mm) in the "X" direction. The resistor "R2" and the resistor "R3" are disposed at the same position in the "Y" direction. Specifically, the resistor "R2" and the resistor "R3" are disposed at a position in the "Y" direction where the track 2d is passed. Further, the resistor "R2" and the resistor "R3" are disposed in a separated state from each other by a predetermined distance (for example, 1.09 mm) in the "X" direction. Further, in the "X" direction, the resistor "R1" and the resistor "R2" are disposed at substantially the same position as each other and the resistor "R3" and the resistor "R4" are disposed at substantially the same position as each other.

In this embodiment, an interval of two times of a bit interval in the track 2c when "0" data are recorded in the track 2c are defined as "$\lambda_1$", an interval of two times of a bit interval in the track 2d when "0" data are recorded in the track 2d are defined as "$\lambda_2$", "$n_1$" and "$n_2$" are an integer of 0 or more and, as described above, "m" is an integer of 3 or more. In this case, a pitch "P1" of four pieces of the first resistance part 11 in the "X" direction and a pitch "P4" of four pieces of the fourth resistance part 14 in the "X" direction are set to be ($n_1\lambda_1/m+\lambda_1/2m$), and a pitch "P2" of four pieces of the second resistance part 12 in the "X" direction and a pitch "P3" of four pieces of the third resistance part 13 in the "X" direction are set to be ($n_2\lambda_2/m+\lambda_2/2m$).

In this embodiment, recording density of magnetic data recorded in the track 2c is 75 bpi and thus "$\lambda_1$" is 0.68 mm (=25.4×2/75). Further, recording density of magnetic data recorded in the track 2d is 210 bpi and thus "$\lambda_2$" is 0.24 mm (=25.4×2/210). Further, in this embodiment, "n1"=0 and "n2"=1. In addition, in this embodiment, as described above, "m"=4. Therefore, in this embodiment, the pitches "P1" and "P4" are 0.085 mm and the pitches "P2" and "P3" are 0.091 mm.

Similarly to the first embodiment, a length of the first resistance part 11 in the "Y" direction, a length of the second resistance part 12 in the "Y" direction, a length of the third resistance part 13 in the "Y" direction, and a length of the fourth resistance part 14 in the "Y" direction are set to be equal to each other. For example, the length is 2 mm. Further, a width of the first resistance part 11 in the "X" direction, a width of the second resistance part 12 in the "X" direction, a width of the third resistance part 13 in the "X" direction, and a width of the fourth resistance part 14 in the "X" direction are set to be equal to each other. For example, the width is 80 μm. In addition, a film thickness of the resistor "R1", a film thickness of the resistor "R2", a film thickness of the resistor "R3", and a film thickness of the resistor "R4" are set to be equal to each other. For example, the film thickness is 45 nm.

Similarly to the first embodiment, in this embodiment, a potential difference between a first midpoint "C1" between the resistor "R1" and the resistor "R2" serially-connected with each other and a second midpoint "C2" between the resistor "R3" and the resistor "R4" serially-connected with each other is an output of the MR sensor 10. Therefore, when a card 2 in which magnetic data in a track 2c and/or magnetic data in a track 2d are recorded is passed through a disposed position of the MR sensor 10, a signal is outputted from the MR sensor 10.

Further, in a case that, when magnetic data recorded in a magnetic stripe 2a are read by a magnetic head 7, magnetic data are recorded in a track 2c so that an output signal "SG1" from the magnetic head 7 is varied like the solid line in FIG. 5(A) and magnetic data are recorded in a track 2d so that an output signal "SG2" from the magnetic head 7 is varied like the two-dot chain line in FIG. 5(A), when a card 2 is passed through a disposed position of the MR sensor 10, a potential (midpoint potential) "V1" of the first midpoint "C1" is varied like the solid line in FIG. 8 and a potential (midpoint potential) "V2" of the second midpoint "C2" is varied like the two-dot chain line in FIG. 8, and an output signal "SG3" of the MR sensor 10 is varied like the thick solid line in FIG. 8. In other words, also in this embodiment, the output signal "SG3" of the MR sensor 10 is different from a signal corresponding to magnetic data recorded in the magnetic stripe 2a (in other words, different from the output signals "SG1" and "SG2" of the magnetic head 7).

(Principal Effects in this Embodiment)

As described above, also in this embodiment, when a card 2 in which magnetic data are recorded in a magnetic stripe 2a is passed through a disposed position of the MR sensor 10, a signal is outputted from the MR sensor 10 and an output signal "SG3" of the MR sensor 10 is different from a signal corresponding to magnetic data recorded in the magnetic stripe 2a (different from the output signals "SG1" and "SG2" of the magnetic head 7). Therefore, also in this embodiment, similarly to the first embodiment, even when the MR sensor 10 is capable of detecting whether magnetic data are recorded in the magnetic stripe 2a or not, illegal acquisition of magnetic information by a criminal can be prevented. Further, also in this embodiment, a cost of the MR sensor 10 can be reduced.

Further, in this embodiment, the pitch "P1" of the first resistance part 11 in the "X" direction and the pitch "P4" of the fourth resistance part 14 in the "X" direction are set to be $(n_1\lambda_1/m+\lambda_1/2m)$, and the pitch "P2" of the second resistance part 12 in the "X" direction and the pitch "P3" of the third resistance part 13 in the "X" direction are set to be $(n_2\lambda_2/m+\lambda_2/2m)$. Therefore, an amplitude of each of resistance change rates of the resistor "R1", the resistor "R2", the resistor "R3" and the resistor "R4" when a card 2 recorded with magnetic data in a magnetic stripe 2a is passed through a disposed position of the MR sensor 10 can be made small.

In the first embodiment, in a case that magnetic data are recorded in only one of the track 2c or the track 2d, the output signal "SG3" from the MR sensor 10 is varied at a period which is different from a period of the signal corresponding to magnetic data recorded in the magnetic stripe 2a but is varied in a shape close to the signal corresponding to the magnetic data recorded in the magnetic stripe 2a. Therefore, in the first embodiment, in a case that magnetic data are recorded in only one of the track 2c or the track 2d, magnetic information may be illegally acquired by a criminal. However, in this embodiment, even when magnetic data are recorded in only one of the track 2c or the track 2d, the output signal "SG3" of the MR sensor 10 becomes a signal completely different from the signal corresponding to magnetic data recorded in the magnetic stripe 2a. Therefore, according to this embodiment, even when magnetic data are recorded in only one of the track 2c or the track 2d, illegal acquisition of magnetic information by a criminal can be prevented.

(Modified Embodiment of Second Embodiment)

In the embodiment described above, the pitch "P1" of the first resistance part 11 and the pitch "P4" of the fourth resistance part 14 are set to be $(n_1\lambda_1/m+\lambda_1/2m)$. However, the pitches "P1" and "P4" may be set to be a value other than the value of $(n_1\lambda_1/m+\lambda_1/2m)$. Similarly, in the embodiment described above, the pitch "P2" of four pieces of the second resistance part 12 and the pitch "P3" of four pieces of the third resistance part 13 are set to be $(n_2\lambda_2/m+\lambda_2/2m)$. However, the pitches "P2" and "P3" may be a value other than the value of $(n_2\lambda_2/m+\lambda_2/2m)$. Further, in the embodiment described above, the pitch "P1" and the pitch "P4" are equal to each other, but the pitch "P1" and the pitch "P4" may be different from each other. Similarly, in the embodiment described above, the pitch "P2" and the pitch "P3" are equal to each other, but the pitch "P2" and the pitch "P3" may be different from each other.

[Third Embodiment]

(Structure of MR Sensor)

Figure 9:
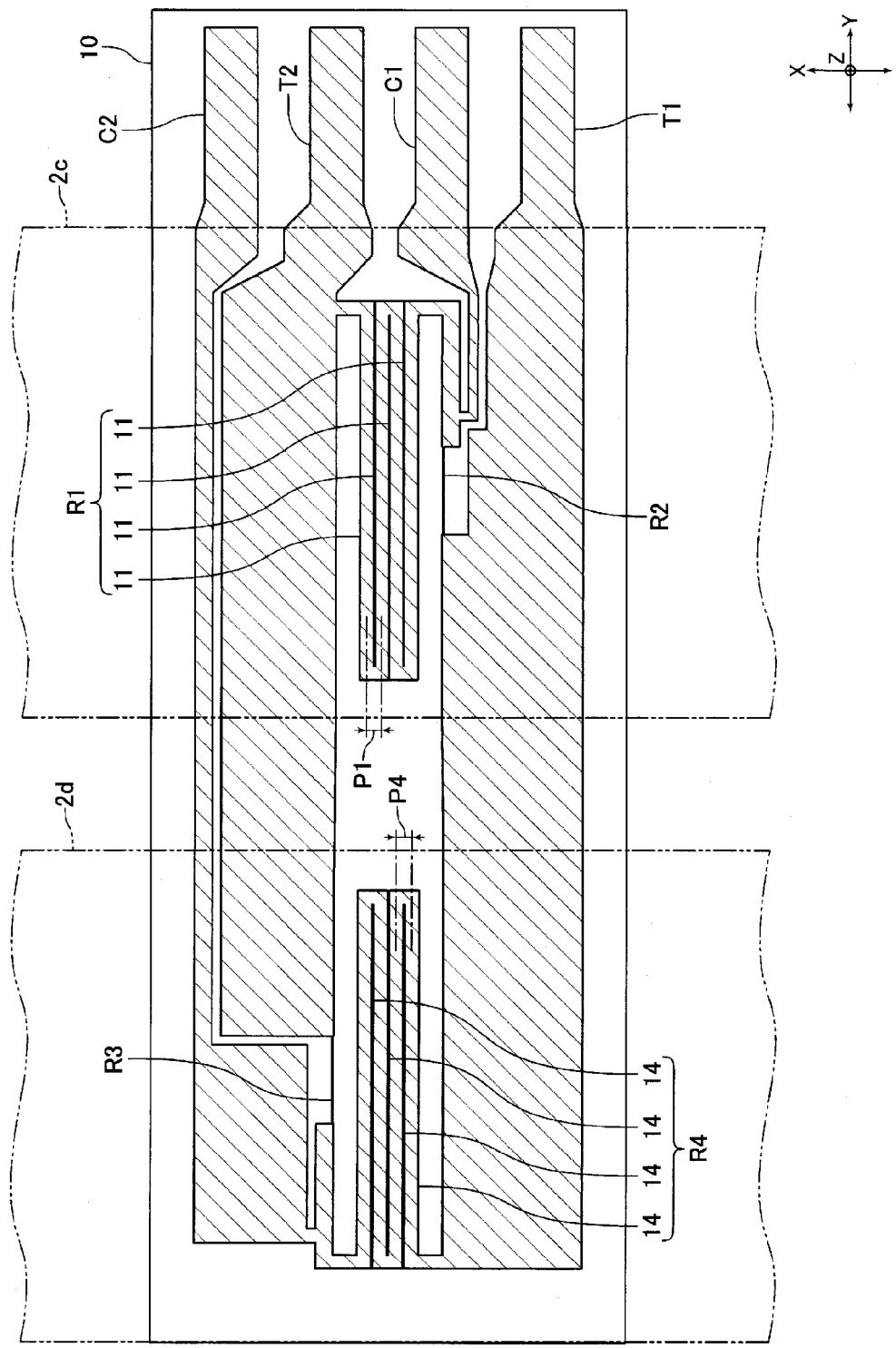
FIG. 9 is a plan view showing an MR sensor in accordance with a third embodiment of the present invention.
Figures 10A, 10B:
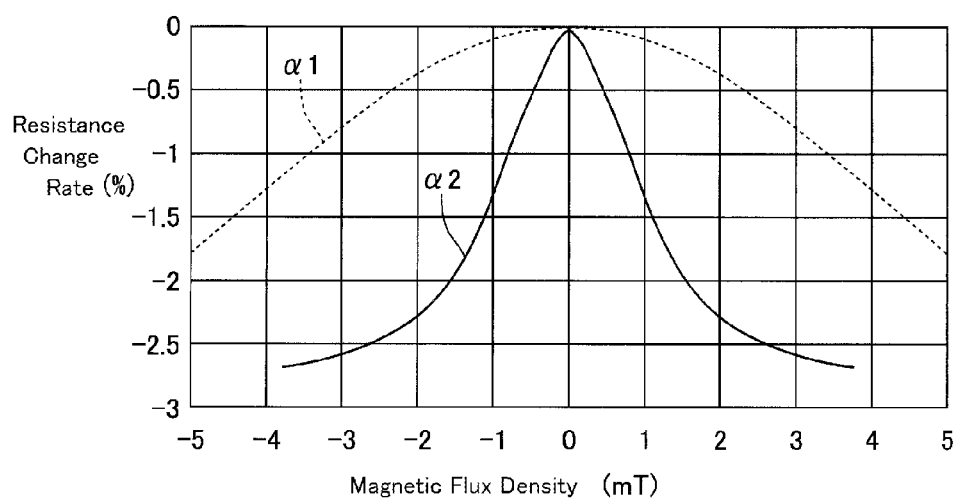
FIG. 10(A) is a graph showing relationships between resistance change rates of a first through a fourth resistors shown in FIG. 9 and magnetic flux density.
FIG. 10(B) is a table showing a resistance change rate of the second and the third resistors, a resistance change rate of the first and the fourth resistors, and a ratio between a resistance change rate of the second and the third resistors and a resistance change rate of the first and the fourth resistors when magnetic flux density is a predetermined value in FIG. 10(A).
Figure 11:
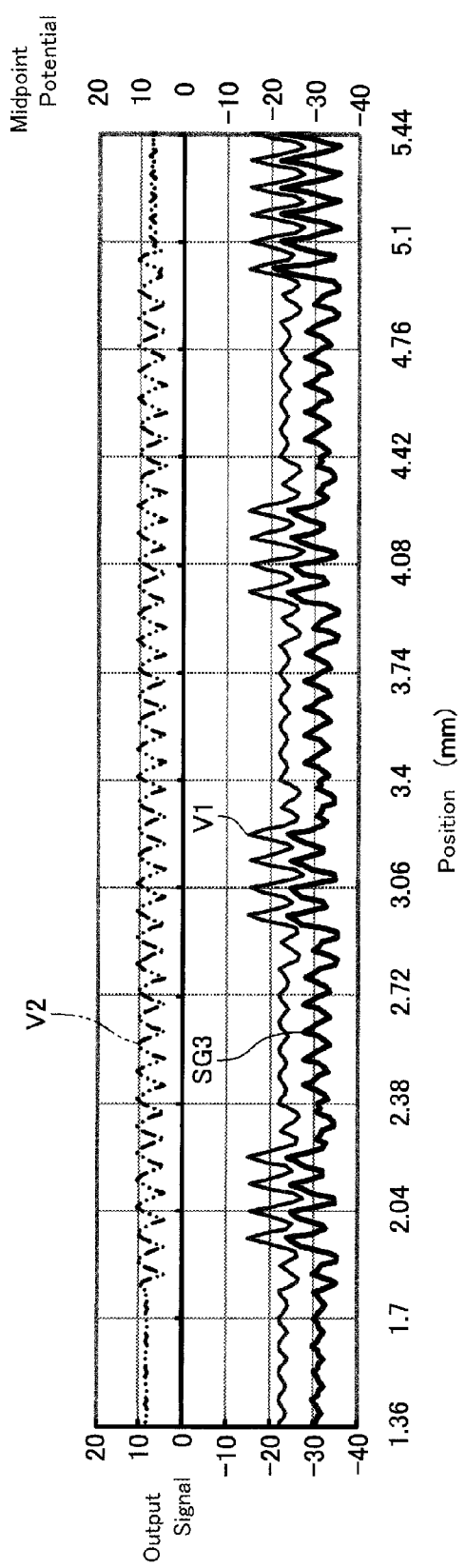
FIG. 11 is a view showing an example of an output signal of an MR sensor shown in FIG. 9.

FIG. 9 is a plan view showing an MR sensor 10 in accordance with a third embodiment of the present invention. FIG. 10(A) is a graph showing a relationship between resistance change rates "α1" and "α2" of a first through a fourth resistors "R1" through "R4" shown in FIG. 9 and magnetic flux density. FIG. 10(B) is a table showing a resistance change rate "α1" of resistors "R2" and "R3", a resistance change rate "α2" of resistors "R1" and "R4" and a ratio between a resistance change rate "α1" of resistors "R2" and "R3" and a resistance change rate "α2" of resistors "R1" and "R4" when magnetic flux density is a predetermined value in FIG. 10(A). FIG. 11 is a view showing an example of an output signal of an MR sensor shown in FIG. 9.

A structure of an MR sensor 10 in a third embodiment is different from the MR sensors 10 in the first and the second embodiments. Therefore, in the following descriptions, a structure of an MR sensor 10 in accordance with a third embodiment will be described below mainly on differences between the structures of the MR sensors 10 in the first and the second embodiments and a structure of an MR sensor 10 in the third embodiment. In FIG. 9, the same reference signs are used in the same structures as the first and the second embodiments.

Similarly to the MR sensors 10 in the first and the second embodiments, an MR sensor 10 in this embodiment includes a resistor "R1" and a resistor "R2" serially-connected with each other and a resistor "R3" and a resistor "R4" serially-connected with each other. The resistor "R1" and the resistor "R2" are connected in parallel with the resistor "R3" and the resistor "R4". The resistor "R2" and the resistor "R4" are connected with a power supply "Vcc" and the resistor "R1" and the resistor "R3" are grounded. In other words, a circuit diagram of the MR sensor 10 in this embodiment is the same as the circuit diagram shown in FIG. 3.

Similarly to the second embodiment, when "m" is an integer of 3 or more, the resistors "R1" and "R4" are formed by being folded back "m−1" times in the "Y" direction. In other words, the resistors "R1" and "R4" are formed by being folded back two times or more in the "Y" direction. In this embodiment, "m"=4, and the resistors "R1" and "R4" are formed by being folded back three times in the "Y" direction. The resistor "R1" is provided with four pieces ("m" pieces) of a first resistance part 11 which is formed in a straight line shape parallel to the "Y" direction. The resistor "R4" is provided with four pieces ("m" pieces) of a fourth resistance part 14 which is formed in a straight line shape parallel to the "Y" direction. On the other hand, the resistor "R2" and the resistor "R3" are formed in a straight line shape parallel to the "Y" direction.

As shown in FIG. 9, the resistor "R1" and the resistor "R2" are disposed so that a center of the resistor "R1" in the "Y" direction and a center of the resistor "R2" in the "Y" direction are substantially coincided with each other. Further, the resistor "R1" and the resistor "R2" are disposed at a position in the "Y" direction where the track 2c is passed. Further, the resistor "R1" and the resistor "R2" are disposed in a separated state from each other by a predetermined distance in the "X" direction. The resistor "R3" and the resistor "R4" are disposed so that a center of the resistor "R3" in the "Y" direction and a center of the resistor "R4" in the "Y" direction are substantially coincided with each other. Further, the resistor "R3" and the resistor "R4" are disposed at a position in the "Y" direction where the track 2d is passed. Further, the resistor "R3" and the resistor "R4" are disposed in a separated state from each other by a predetermined distance in the "X" direction. The resistor "R1" and the resistor "R4" are disposed substantially at the same position as each other in the "X" direction.

Similarly to the second embodiment, an interval of two times of a bit interval in the track 2c when "0" data are recorded in the track 2c are defined as "$\lambda_1$", an interval of two times of a bit interval in the track 2d when "0" data are recorded in the track 2d are defined as "$\lambda_2$", "$n_1$" and "$n_2$" are an integer of 0 or more and, as described above, "m" is an integer of 3 or more. In this case, a pitch "P1" of four pieces of the first resistance part 11 in the "X" direction is set to be ($n_1\lambda_1/m+\lambda_1/2m$). Further, a pitch "P4" of four pieces of the fourth resistance part 14 in the "X" direction is set to be ($n_2\lambda_2/m+\lambda_2/2m$). In this embodiment, similarly to the second embodiment, "$\lambda_1$" is 0.68 mm, "$\lambda_2$" is 0.24 mm, "$n_1$"=0, "$n_2$"=1, and "m"=4. Therefore, the pitch "P1" is 0.085 mm, and the pitch "P4" is 0.091 mm.

A width of the resistor "R2" in the "X" direction is set to be 1/10 or less of a width of the first resistance part 11 in the "X" direction. Further, a width of the resistor "R3" in the "X" direction is set to be 1/10 or less of a width of the fourth resistance part 14 in the "X" direction. In this embodiment, a width of the first resistance part 11 and a width of the fourth resistance part 14 in the "X" direction are, for example, 80 μm, and a width of the resistor "R2" and a width of the resistor "R3" in the "X" direction are, for example, 5 μm.

In this embodiment, a length of the first resistance part 11 in the "Y" direction and a length of the fourth resistance part 14 in the "Y" direction are equal to each other and, for example, the length is 2 mm. Further, a length of the resistor "R2" in the "Y" direction and a length of the resistor "R3" in the "Y" direction are equal to each other and, for example, the length is 0.5 mm. In addition, a film thickness of the resistor "R1", a film thickness of the resistor "R2", a film thickness of the resistor "R3", and a film thickness of the resistor "R4" are equal to each other and, for example, the film thickness is 45 nm.

In this embodiment, a width of the resistor "R2" and a width of the resistor "R3" in the "X" direction are 5 μm and thus the widths of the resistors "R2" and "R3" in the "X" direction are narrow. Therefore, even when magnetic fields are applied to the resistors "R2" and "R3" (in other words, even when a card 2 in which magnetic data are recorded in a track 2c and a track 2d is passed through disposed positions of the resistor "R2" and "R3"), resistance change rates of the resistors "R2" and "R3" are extremely small.

In a case that the width of the resistors "R2" and "R3" in the "X" direction is set to be 1/10 of the width of the first resistance part 11 and the fourth resistance part 14 in the "X" direction, the resistance change rate "α1" of the resistors "R2" and "R3" with respect to strength of a magnetic field (magnetic flux density) is varied as shown by the broken line in FIG. 10(A) and the resistance change rate "α2" of the resistors "R1" and "R4" with respect to a magnetic flux density is varied as shown by the solid line in FIG. 10(A). Further, a magnetic flux density of magnetic data recorded in a magnetic stripe 2a of a card 2 is commonly from 0.5 mT (milli-Tesla) to 3 mT.

Therefore, when the width in the "X" direction of the resistors "R2" and "R3" is set to be 1/10 of the width in the "X" direction of the first resistance part 11 and the fourth resistance part 14, as shown in FIG. 10(B), a ratio of the resistance change rate "α1" of the resistors "R2" and "R3" with respect to the resistance change rate "α2" of the resistors "R1" and "R4", i.e., (α1/α2×100) can be suppressed in 28% or less. In other words, when widths of the resistor "R2" and "R3" in the "X" direction are set to be 1/10 of the widths in the "X" direction of the first resistance part 11 and the fourth resistance part 14, a ratio of the resistance change rate "α1" with respect to the resistance change rate "α2" can be suppressed in 1/3 or less. Further, when widths of the resistors "R2" and "R3" in the "X" direction are set to be further smaller than 1/10 of the widths in the "X" direction of the first resistance part 11 and the fourth resistance part 14, a ratio of the resistance change rate "α1" with respect to the resistance change rate "α2" can be made further small.

Similarly to the first and the second embodiments, in this embodiment, a potential difference between a first midpoint "C1" between the resistor "R1" and the resistor "R2" serially-connected with each other and a second midpoint "C2" between the resistor "R3" and the resistor "R4" serially-connected with each other is an output of the MR sensor 10. Therefore, when a card 2 in which magnetic data in a track 2c and/or magnetic data in a track 2d are recorded is passed through a disposed position of the MR sensor 10, a signal is outputted from the MR sensor 10.

Further, in a case that, when magnetic data recorded in a magnetic stripe 2a are read by a magnetic head 7, magnetic data are recorded in a track 2c so that an output signal "SG1" from the magnetic head 7 is varied like the solid line in FIG. 5(A) and magnetic data are recorded in a track 2d so that an output signal "SG2" from the magnetic head 7 is varied like the two-dot chain line in FIG. 5(A), when a card 2 is passed through a disposed position of the MR sensor 10, a potential (midpoint potential) "V1" of the first midpoint "C1" is varied like the solid line in FIG. 11 and a potential (midpoint potential) "V2" of the second midpoint "C2" is varied like the two-dot chain line in FIG. 11, and an output signal "SG3" of the MR sensor 10 is varied like the thick solid line in FIG. 11. In other words, also in this embodiment, the output signal "SG3" of the MR sensor 10 is different from a signal corresponding to magnetic data recorded in the magnetic stripe 2a (in other words, different from the output signals "SG1" and "SG2" of the magnetic head 7). In this embodiment, as described above, a ratio of the resistance change rate "α1" with respect to the resistance change rate "α2" can be suppressed to ⅓ or less and thus a large amplitude of the output signal "SG3" of the MR sensor 10 can be secured.

(Principal Effects in this Embodiment)

As described above, also in this embodiment, when a card 2 in which magnetic data are recorded in a magnetic stripe 2a is passed through a disposed position of the MR sensor 10, a signal is outputted from the MR sensor 10 and an output signal "SG3" of the MR sensor 10 is different from a signal corresponding to magnetic data recorded in the magnetic stripe 2a (different from the output signals "SG1" and "SG2" of the magnetic head 7). Therefore, also in this embodiment, similarly to the first and the second embodiments, even when the MR sensor 10 is capable of detecting whether magnetic data are recorded in the magnetic stripe 2a or not, illegal acquisition of magnetic information by a criminal can be prevented. Further, also in this embodiment, a cost of the MR sensor 10 can be reduced.

Further, in this embodiment, the pitch "P1" in the "X" direction of the first resistance part 11 is set to be $(n_1\lambda_1/m + \lambda_1/2m)$, and the pitch "P4" in the "X" direction of the fourth resistance part 14 is set to be $(n_2\lambda_2/m + \lambda_2/2m)$. Therefore, an amplitude of each of resistance change rates of the resistor "R1" and the resistor "R4" when a card 2 in which magnetic data are recorded in a magnetic stripe 2a is passed through a disposed position of the MR sensor 10 can be made small.

As described above, in the first embodiment, in a case that magnetic data are recorded in only one of the track 2c or the track 2d, magnetic information may be illegally acquired by a criminal. However, according to this embodiment, similarly to the second embodiment, even when magnetic data are recorded in only one of the track 2c or the track 2d, the output signal "SG3" of the MR sensor 10 becomes a signal completely different from the signal corresponding to magnetic data recorded in the magnetic stripe 2a. Therefore, according to this embodiment, even when magnetic data are recorded in only one of the track 2c or the track 2d, illegal acquisition of magnetic information by a criminal can be prevented.

In the second embodiment, for example, in a case that a magnetic field strength generated by magnetic data in the track 2c and a magnetic field strength generated by magnetic data in the track 2d are substantially the same as each other and, when the magnetic field strength sensed by the resistors "R1" and "R4" and the magnetic field strength sensed by the resistors "R2" and "R3" are substantially the same as each other, an output of the MR sensor 10 may be lowered at a predetermined timing when a card 2 in which magnetic data are recorded in a magnetic stripe 2a is passed through a disposed position of the MR sensor 10 and accuracy of detection of the MR sensor 10 is deteriorated. However, according to this embodiment, occurrence of this problem can be prevented.

(Modified Embodiment of Third Embodiment)

Figure 12:
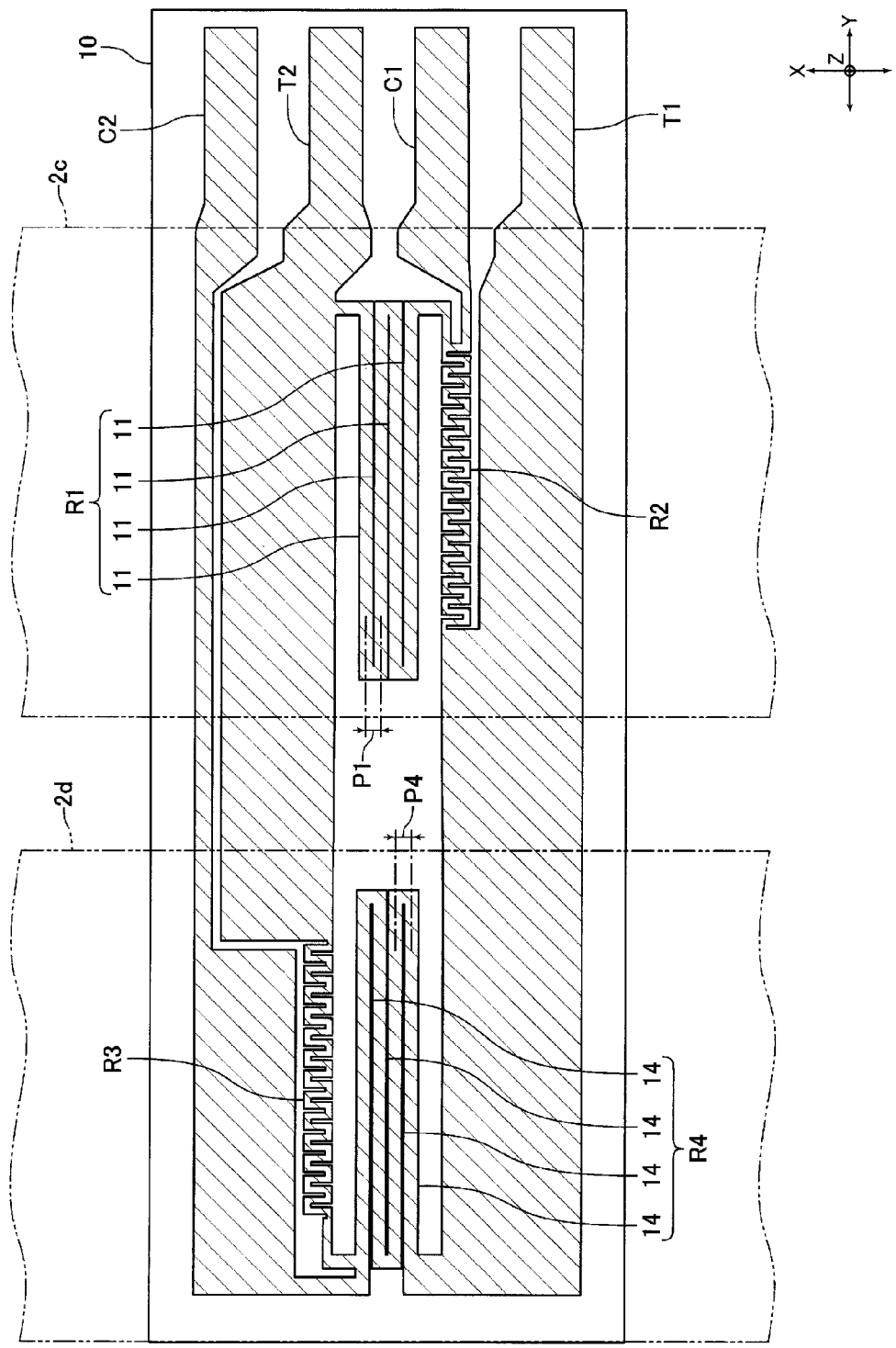
FIG. 12 is a plan view showing an MR sensor in accordance with a modified embodiment of a third embodiment of the present invention.
Figure 13:
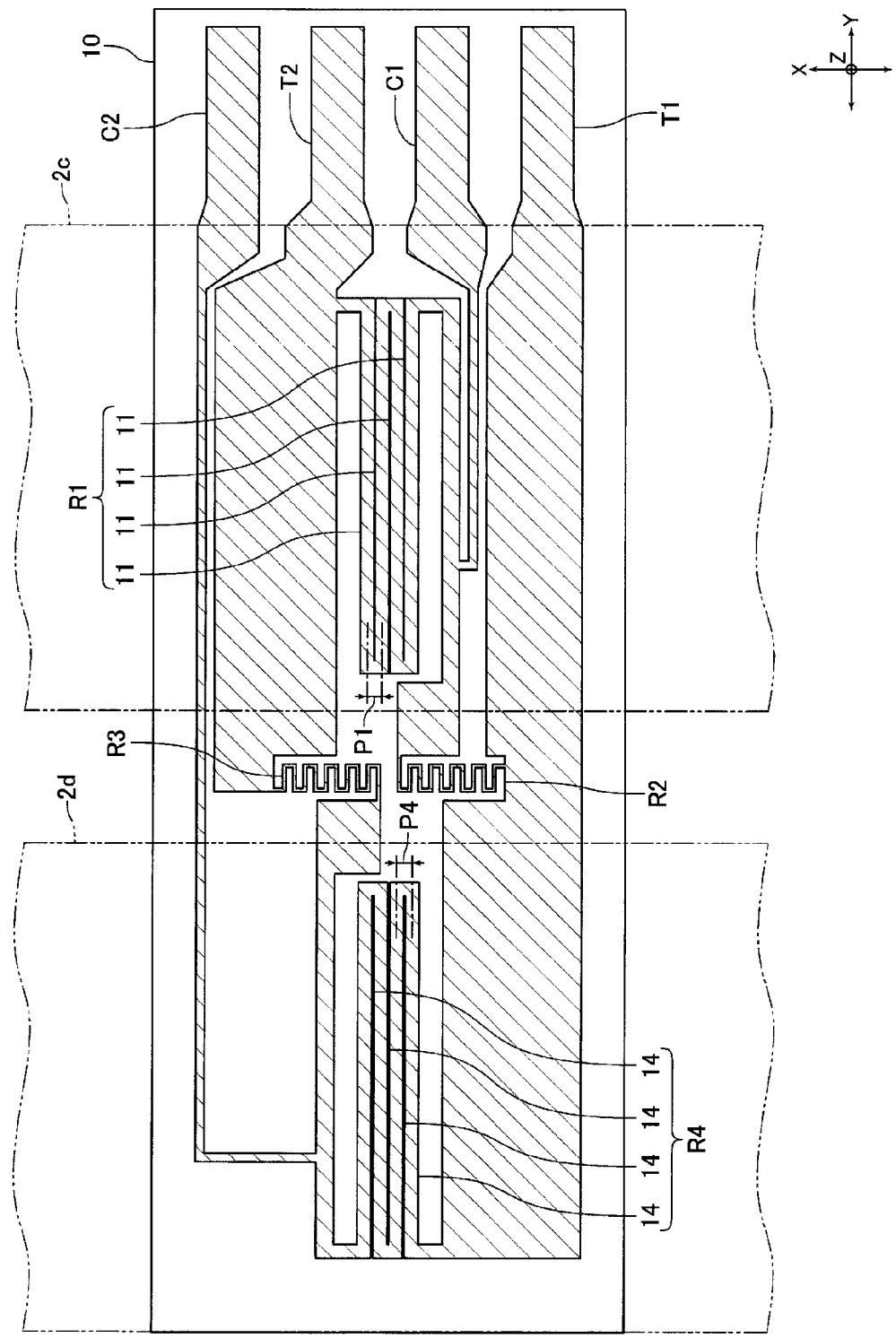
FIG. 13 is a plan view showing an MR sensor in accordance with a modified embodiment of a third embodiment of the present invention.

FIG. 12 is a plan view showing an MR sensor 10 in accordance with a modified embodiment of the third embodiment of the present invention. FIG. 13 is a plan view showing an MR sensor 10 in accordance with a modified embodiment of the third embodiment of the present invention.

In the MR sensor 10 shown in FIG. 9, the resistor "R2" and the resistor "R3" are formed in a straight line shape parallel to the "Y" direction. However, the present invention is not limited to this embodiment. For example, as shown in FIG. 12, the resistor "R2" and the resistor "R3" may be formed by being folded back a plurality of times in the "X" direction. Specifically, the resistor "R2" and the resistor "R3" may be formed by being folded back a plurality of times in the "X" direction so that portions of the resistors "R2" and "R3" parallel to the "X" direction become longer than portions of the resistors "R2" and "R3" parallel to the "Y" direction. In accordance with an embodiment of the present invention, the resistor "R2" and/or the resistor "R3" may be formed by being folded back once in the "X" direction.

Also in this case, resistance change rates of the resistors "R2" and "R3" when magnetic fields are applied to the resistors "R2" and "R3" (in other words, when a card 2 in which magnetic data are recorded in a track 2c and a track 2d is passed through disposed positions of the resistors "R2" and "R3") are extremely small. Therefore, also in this case, an output signal "SG3" of the MR sensor 10 when a card 2 in which magnetic data are recorded in a magnetic stripe 2a is passed through a disposed position of the MR sensor 10 is, for example, varied like a thick solid line in FIG. 11. In other words, also in this case, an output signal "SG3" of the MR sensor 10 when a card 2 in which magnetic data are recorded in a magnetic stripe 2a is passed through a disposed position of the MR sensor 10 is different from a signal corresponding to magnetic data recorded in a magnetic stripe 2a (different from output signals "SG1" and "SG2" of the magnetic head 7). Therefore, also in this case, effects of the third embodiment can be obtained. In FIG. 12, the same reference signs are used in the same structures as the structures shown in FIG. 9.

Further, as shown in FIG. 13, the resistor "R2" and the resistor "R3" may be disposed at positions displaced from a position where a track 2c is passed and at positions displaced from a position where a track 2d is passed. For example, the resistor "R2" and the resistor "R3" may be disposed in the "Y" direction between a position where a track 2c is passed and a position where a track 2d is passed. In an embodiment shown in FIG. 13, the resistors "R2" and "R3" are formed so as to be folded back a plurality of timed in the "Y" direction. However, the resistors "R2" and "R3" may be formed in other shapes.

Also in this case, when magnetic fields are applied to the resistors "R2" and "R3" (in other words, when a card 2 in which magnetic data are recorded in a track 2c and a track 2d is passed through disposed positions of the resistors "R2" and "R3"), resistance change rates of the resistors "R2" and "R3" are extremely small. Therefore, also in this case, an output signal "SG3" of the MR sensor 10 when a card 2 in which magnetic data are recorded in a magnetic stripe 2a is passed through a disposed position of the MR sensor 10 is, for example, varied like the thick solid line in FIG. 11 and is different from a signal corresponding to magnetic data recorded in a magnetic stripe 2a (different from output signals "SG1" and "SG2" of the magnetic head 7). Therefore, also in this case, effects of the third embodiment described above can be obtained. In FIG. 13, the same reference signs are used in the same structures as the structures shown in FIG. 9.

In the MR sensors 10 shown in FIGS. 9 and 12, the resistor "R2" is disposed at a position in the "Y" direction where a track 2c is passed. However, the resistor "R2" may be disposed at a position in the "Y" direction displaced from a position where a track 2c is passed. Further, in the MR sensors 10 shown in FIGS. 9 and 12, the resistor "R3" is disposed at a position in the "Y" direction where a track 2d is passed. However, the resistor "R3" may be disposed at a position in the "Y" direction displaced from a position where a track 2d is passed.

In the MR sensors 10 shown in FIGS. 9, 12 and 13, the pitch "P1" of the first resistance part 11 is set to be $(n_1\lambda_1/m+\lambda_1/2m)$. However, the pitch "P1" may be set to be a value other than $(n_1\lambda_1/m+\lambda_1/2m)$. Similarly, in the MR sensors 10 shown in FIGS. 9, 12 and 13, the pitch "P4" of the fourth resistance part 14 is set to be $(n_2\lambda_2/m+\lambda_2/2m)$. However, the pitch "P4" may be set to be a value other than $(n_2\lambda_2/m+\lambda_2/2m)$.

[Other Embodiments]

Although the present invention has been shown and described with reference to a specific embodiment, various changes and modifications will be apparent to those skilled in the art from the teachings herein.

In the first embodiment, the resistors "R3" and "R4" are disposed at a position in the "Y" direction where a track 2d is passed. However, the present invention is not limited to this embodiment. For example, the resistors "R3" and "R4" may be disposed at a position in the "Y" direction where a track 2b is passed. In this case, a magnetic stripe 2a is recorded with magnetic data in a track 2b without being recorded with magnetic data in a track 2d. Further, in the second embodiment, the resistors "R2" and "R3" are disposed at positions in the "Y" direction where a track 2d is passed. However, the resistors "R2" and "R3" may be disposed at positions in the "Y" direction where a track 2b is passed. Further, in the MR sensor 10 shown in FIG. 9 and the MR sensor 10 shown in FIG. 12, the resistors "R3" and "R4" are disposed at positions in the "Y" direction where a track 2d is passed. However, the resistors "R3" and "R4" may be disposed at positions in the "Y" direction where a track 2b is passed. Further, in the MR sensor 10 shown in FIG. 13, the resistor "R4" is disposed at a position in the "Y" direction where a track 2d is passed. However, the resistor "R4" may be disposed at a position in the "Y" direction where a track 2b is passed.

In the embodiment described above, the card reader 1 is a card conveyance type card reader having drive rollers 8 and pad rollers 9. However, the card reader 1 may be a manual type card reader in which a card is manually operated by a user.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An MR sensor for a card reader structured to detect whether or not magnetic data are recorded in a magnetic stripe of a card, the card comprising a magnetic stripe having a first track and second track each configured to store magnetic data, the MR sensor comprising:
   a first resistor and a second resistor serially-connected with each other and disposed at positions where the first track is passed; and
   a third resistor and a fourth resistor serially-connected with each other and disposed at positions where the second track is passed;
   wherein the second resistor and the fourth resistor are connected with a power supply, and the first resistor and the third resistor are grounded, and
   wherein a potential difference between a first midpoint between the first resistor and the second resistor and a second midpoint between the third resistor and the fourth resistor is an output of the MR sensor.

2. The MR sensor according to claim 1, wherein
   the first resistor and the second resistor are disposed in a separated state from each other in a passing direction of the card by a distance of an multiple of an interval of half of a bit in the first track when "0" data are recorded in the first track, and
   the third resistor and the fourth resistor are disposed in a separated state from each other in the passing direction of the card by a distance of an odd multiple of an interval of a half of a bit in the second track when "0" data are recorded in the second track.

3. The MR sensor according to claim 1, wherein each of the first resistor, the second resistor, the third resistor and the fourth resistor is folded back a plurality of times in a direction perpendicular to a passing direction of the card.

4. An MR sensor for a card reader structured to detect whether or not magnetic data are recorded in a magnetic stripe of a card, the card comprising a magnetic stripe having a first track and second track each configured to store magnetic data, the MR sensor comprising:
   a first resistor and a second resistor serially-connected with each other; and
   a third resistor and a fourth resistor serially-connected with each other;
   wherein the first resistor and the fourth resistor are disposed at positions where the first track is passed;
   wherein the second resistor and the third resistor are disposed at positions where the second track is passed;
   wherein the second resistor and the fourth resistor are connected with a power supply, and the first resistor and the third resistor are grounded;
   wherein each of the first resistor, the second resistor, the third resistor and the fourth resistor is folded back two times or more in a first direction perpendicular to a passing direction of the card; and
   wherein a potential difference between a first midpoint between the first resistor and the second resistor and a second midpoint between the third resistor and the fourth resistor is an output of the MR sensor.

5. The MR sensor according to claim 4, wherein
   in a case that an interval of two times of a bit interval of the first track when "0" data are recorded in the first track is defined as "$\lambda_1$", an interval of two times of a bit interval of the second track when "0" data are recorded in the second track is defined as "$\lambda_2$", "$n_1$" and "$n_2$" are an integer of 0 or more, and "m" is an integer of 3 or more, each of the first resistor, the second resistor, the third resistor and the fourth resistor is folded back "m−1" times in a first direction, the first resistor comprises "m" pieces of a first resistance part which are formed in a straight line shape parallel to the first direction and are disposed at a pitch of ($n_1\lambda_1$/m+$\lambda_1$/2m) in the passing direction of the card, the second resistor comprises "m" pieces of a second resistance part which are formed in a straight line shape parallel to the first direction and are disposed at a pitch of ($n_2\lambda_2$/m+$\lambda_2$/2m) in the passing direction of the card, the third resistor comprises "m" pieces of a third resistance part which are formed in a straight line shape parallel to the first direction and are disposed at a pitch of ($n_2\lambda_2$/m+$\lambda_2$/2m) in the passing direction of the card, and the fourth resistor comprises "m" pieces of a fourth resistance part which are formed in a straight line shape parallel to the first direction and are disposed at a pitch of ($n_1\lambda_1$/ m+$\lambda_1$/2m) in the passing direction of the card.

6. An MR sensor for a card reader structured to detect whether or not magnetic data are recorded in a magnetic stripe of a card, the card comprising a magnetic stripe having a first track and second track each configured to store magnetic data the MR sensor comprising:

a first resistor and a second resistor serially-connected with each other; and a third resistor and a fourth resistor serially-connected with each other;

wherein the first resistor is disposed at a position where the first track is passed, and the fourth resistor is disposed at a position where the second track is passed;

wherein the second resistor and the fourth resistor are connected with a power supply, and the first resistor and the third resistor are grounded;

wherein each of the first resistor and the fourth resistor is folded back two times or more in a first direction perpendicular to a passing direction of the card;

wherein each of the second resistor and the third resistor is formed in a straight line shape parallel to the first direction;

wherein the first resistor comprises three or more pieces of a first resistance part which is formed in a straight line shape parallel to the first direction;

wherein the fourth resistor comprises three or more pieces of a fourth resistance part which is formed in a straight line shape parallel to the first direction;

wherein a width of the second resistor in a passing direction of the card is set to be 1/10 or less of a width of the first resistance part in the passing direction of the card;

wherein a width of the third resistor in the passing direction of the card is set to be 1/10 or less of a width of the fourth resistance part in the passing direction of the card; and wherein a potential difference between a first midpoint between the first resistor and the second resistor and a second midpoint between the third resistor and the fourth resistor is an output of the MR sensor.

7. The MR sensor according to claim 6, wherein the second resistor is disposed at a position where the first track is passed, and the third resistor is disposed at a position where the second track is passed.

8. The MR sensor according to claim 6, wherein in a case that an interval of two times of a bit interval of the first track when "0" data are recorded in the first track is defined as "$\lambda_1$", an interval of two times of a bit interval of the second track when "0" data are recorded in the second track is defined as "$\lambda_2$", "$n_1$" and "$n_2$" are an integer of 0 or more, and "m" is an integer of 3 or more, each of the first resistor and the fourth resistor is folded back "m−1" times in the first direction, the first resistor comprises "m" pieces of a first resistance part which are formed in a straight line shape parallel to the first direction and are disposed at a pitch of ($n_1\lambda_1$/m+$\lambda_1$/2m) in the passing direction of the card, and the fourth resistor comprises "m" pieces of a fourth resistance part which are formed in a straight line shape parallel to the first direction and are disposed at a pitch of ($n_2\lambda_2$/ m+$\lambda_2$/2m) in the passing direction of the card.

9. An MR sensor for a card reader structured to detect whether or not magnetic data are recorded in a magnetic stripe of a card, the card comprising a magnetic stripe having a first track and second track each configured to store magnetic data, the MR sensor comprising:

a first resistor and a second resistor serially-connected with each other; and a third resistor and a fourth resistor serially-connected with each other;

wherein the first resistor is disposed at a position where the first track is passed, and the fourth resistor is disposed at a position where the second track is passed;

wherein the second resistor and the fourth resistor are connected with a power supply, and the first resistor and the third resistor are grounded;

wherein each of the first resistor and the fourth resistor is folded back two times or more in a first direction perpendicular to a passing direction of the card;

wherein each of the second resistor and the third resistor is folded back once or more in the passing direction of the card; and wherein a potential difference between a first midpoint between the first resistor and the second resistor and a second midpoint between the third resistor and the fourth resistor is an output of the MR sensor.

10. The MR sensor according to claim 9, wherein the second resistor is disposed at a position where the first track is passed, and the third resistor is disposed at a position where the second track is passed.

11. The MR sensor according to claim 9, wherein in a case that an interval of two times of a bit interval of the first track when "0" data are recorded in the first track is defined as "$\lambda_1$", an interval of two times of a bit interval of the second track when "0" data are recorded in the second track is defined as "$\lambda_2$", "$n_1$" and "$n_2$" are an integer of 0 or more, and "m" is an integer of 3 or more, each of the first resistor and the fourth resistor is folded back "m−1" times in the first direction, the first resistor comprises "m" pieces of a first resistance part which are formed in a straight line shape parallel to the first direction and are disposed at a pitch of ($n_1\lambda_1$/m+$\lambda_1$/2m) in the passing direction of the card, and the fourth resistor comprises "m" pieces of a fourth resistance part which are formed in a straight line shape parallel to the first direction and are disposed at a pitch of $(n_2\lambda_2/m+\lambda_2/2m)$ in the passing direction of the card.

12. An MR sensor for a card reader structured to detect whether or not magnetic data are recorded in a magnetic stripe of a card, the card comprising a magnetic stripe having a first track and second track each configured to store magnetic data the MR sensor comprising:
    a first resistor and a second resistor serially-connected with each other; and
    a third resistor and a fourth resistor serially-connected with each other;
    wherein the first resistor is disposed at a position where the first track is passed, and the fourth resistor is disposed at a position where the second track is passed;
    wherein the second resistor and the third resistor are disposed at positions displaced from the position where the first track is passed and are disposed at positions displaced from the position where the second track is passed;
    wherein the second resistor and the fourth resistor are connected with a power supply, and the first resistor and the third resistor are grounded;
    wherein each of the first resistor and the fourth resistor is folded back two times or more in a first direction perpendicular to a passing direction of the card; and
    wherein a potential difference between a first midpoint between the first resistor and the second resistor and a second midpoint between the third resistor and the fourth resistor is an output of the MR sensor.

13. The MR sensor according to claim 12, wherein
    in a case that an interval of two times of a bit interval of the first track when "0" data are recorded in the first track is defined as "$\lambda_1$", an interval of two times of a bit interval of the second track when "0" data are recorded in the second track is defined as "$\lambda_2$", "$n_1$" and "$n_2$" are an integer of 0 or more, and "m" is an integer of 3 or more, each of the first resistor and the fourth resistor is folded back "m−1" times in the first direction,
    the first resistor comprises "m" pieces of a first resistance part which are formed in a straight line shape parallel to the first direction and are disposed at a pitch of $(n_1\lambda_1/m+\lambda_1/2m)$ in the passing direction of the card, and
    the fourth resistor comprises "m" pieces of a fourth resistance part which are formed in a straight line shape parallel to the first direction and are disposed at a pitch of $(n_2\lambda_2/m+\lambda_2/2m)$ in the passing direction of the card.

14. A card reader for use with a card comprising a magnetic stripe having a first track and second track each configured to store magnetic data, the card reader comprising:
    an MR sensor structured to detect whether or not magnetic data are recorded in the magnetic stripe of a card; and
    a card insertion part which is formed with a card insertion port into which the card is inserted and in which the MR sensor is disposed;
    wherein the MR sensor comprises;
    a first resistor and a second resistor serially-connected with each other and disposed at positions where the first track is passed; and
    a third resistor and a fourth resistor serially-connected with each other and disposed at position where the second track is passed;
    wherein the second resistor and the fourth resistor are connected with a power supply, and the first resistor and the third resistor are grounded, and
    wherein a potential difference between a first midpoint between the first resistor and the second resistor and a second midpoint between the third resistor and the fourth resistor is an output of the MR sensor.

15. A card reader for use with a card comprising a magnetic stripe having a first track and second track each configured to store magnetic data, the card reader comprising:
    an MR sensor structured to detect whether or not magnetic data are recorded in the magnetic stripe of the card; and
    a card insertion part which is formed with a card insertion port into which the card is inserted and in which the MR sensor is disposed;
    the MR sensor comprising:
    a first resistor and a second resistor serially-connected with each other; and
    a third resistor and a fourth resistor serially-connected with each other;
    wherein the first resistor and the fourth resistor are disposed at positions where the first track is passed;
    wherein the second resistor and the third resistor are disposed at positions where the second track is passed;
    wherein the second resistor and the fourth resistor are connected with a power supply, and the first resistor and the third resistor are grounded;
    wherein each of the first resistor, the second resistor, the third resistor and the fourth resistor is folded back two times or more in a first direction perpendicular to a passing direction of the card; and
    wherein a potential difference between a first midpoint between the first resistor and the second resistor and a second midpoint between the third resistor and the fourth resistor is an output of the MR sensor.

16. A card reader for use with a card comprising a magnetic stripe having a first track and second track each configured to store magnetic data, the card reader comprising:
    an MR sensor structured to detect whether or not magnetic data are recorded in the magnetic stripe of the card; and
    a card insertion part which is formed with a card insertion port into which the card is inserted and in which the MR sensor is disposed;
    the MR sensor comprising:
    a first resistor and a second resistor serially-connected with each other; and
    a third resistor and a fourth resistor serially-connected with each other;
    wherein the first resistor is disposed at a position where the first track is passed, and the fourth resistor is disposed at a position where the second track is passed;
    wherein the second resistor and the fourth resistor are connected with a power supply, and the first resistor and the third resistor are grounded;
    wherein each of the first resistor and the fourth resistor is folded back two times or more in a first direction perpendicular to a passing direction of the card;
    wherein each of the second resistor and the third resistor is formed in a straight line shape parallel to the first direction;
    wherein the first resistor comprises three or more pieces of a first resistance part which is formed in a straight line shape parallel to the first direction;
    wherein the fourth resistor comprises three or more pieces of a fourth resistance part which is formed in a straight line shape parallel to the first direction;

wherein a width of the second resistor in a passing direction of the card is set to be ⅟₁₀ or less of a width of the first resistance part in the passing direction of the card;

wherein a width of the third resistor in the passing direction of the card is set to be ⅟₁₀ or less of a width of the fourth resistance part in the passing direction of the card; and wherein a potential difference between a first midpoint between the first resistor and the second resistor and a second midpoint between the third resistor and the fourth resistor is an output of the MR sensor.

17. A card reader for use with a card comprising a magnetic stripe having a first track and second track each configured to store magnetic data, the card reader comprising:

an MR sensor structured to detect whether or not magnetic data are recorded in the magnetic stripe of the card; and a card insertion part which is formed with a card insertion port into which the card is inserted and in which the MR sensor is disposed;

the MR sensor comprising:

a first resistor and a second resistor serially-connected with each other; and a third resistor and a fourth resistor serially-connected with each other;

wherein the first resistor is disposed at a position where the first track is passed, and the fourth resistor is disposed at a position where the second track is passed;

wherein the second resistor and the fourth resistor are connected with a power supply, and the first resistor and the third resistor are grounded;

wherein each of the first resistor and the fourth resistor is folded back two times or more in a first direction perpendicular to a passing direction of the card;

wherein each of the second resistor and the third resistor is folded back once or more in the passing direction of the card; and wherein a potential difference between a first midpoint between the first resistor and the second resistor and a second midpoint between the third resistor and the fourth resistor is an output of the MR sensor.

18. A card reader for use with a card comprising a magnetic stripe having a first track and second track each configured to store magnetic data, the card reader comprising:

an MR sensor structured to detect whether or not magnetic data are recorded in the magnetic stripe of the card; and a card insertion part which is formed with a card insertion port into which the card is inserted and in which the MR sensor is disposed;

the MR sensor comprising:

a first resistor and a second resistor serially-connected with each other; and a third resistor and a fourth resistor serially-connected with each other;

wherein the first resistor is disposed at a position where the first track is passed, and the fourth resistor is disposed at a position where the second track is passed;

wherein the second resistor and the third resistor are disposed at positions displaced from the position where the first track is passed and are disposed at positions displaced from the position where the second track is passed;

wherein the second resistor and the fourth resistor are connected with a power supply, and the first resistor and the third resistor are grounded;

wherein each of the first resistor and the fourth resistor is folded back two times or more in a first direction perpendicular to a passing direction of the card; and wherein a potential difference between a first midpoint between the first resistor and the second resistor and a second midpoint between the third resistor and the fourth resistor is an output of the MR sensor.

* * * * *